(12) United States Patent
Sakhnini et al.

(10) Patent No.: US 12,395,282 B2
(45) Date of Patent: Aug. 19, 2025

(54) MULTIPLEXING TECHNIQUES USING ORTHOGONAL FREQUENCY-DIVISION MULTIPLEXING (OFDM) INDEX MODULATION

(71) Applicant: QUALCOMM Incorporated, San Diego, CA (US)

(72) Inventors: Iyab Issam Sakhnini, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 381 days.

(21) Appl. No.: 18/178,459

(22) Filed: Mar. 3, 2023

(65) Prior Publication Data
US 2024/0297747 A1    Sep. 5, 2024

(51) Int. Cl.
*H04L 5/00*    (2006.01)

(52) U.S. Cl.
CPC .......... *H04L 5/0007* (2013.01); *H04L 5/0025* (2013.01); *H04L 5/0048* (2013.01)

(58) Field of Classification Search
CPC .... H04L 5/0007; H04L 5/0025; H04L 5/0048
See application file for complete search history.

(56) References Cited

U.S. PATENT DOCUMENTS

| | | | |
|---|---|---|---|
| 10,014,996 B1* | 7/2018 | Naim | H04L 5/0046 |
| 10,079,918 B2* | 9/2018 | Xu | H04L 27/2601 |
| 2009/0067543 A1* | 3/2009 | Hsiao | H04L 1/0067 375/295 |
| 2013/0301744 A1* | 11/2013 | Stadelmeier | H04B 3/54 375/257 |
| 2018/0227888 A1* | 8/2018 | Hwang | H04W 72/23 |
| 2022/0255675 A1* | 8/2022 | Wu | H04L 1/1822 |
| 2024/0039777 A1* | 2/2024 | Meng | H04L 1/0067 |
| 2024/0056218 A1* | 2/2024 | He | H04L 1/0057 |
| 2024/0129091 A1* | 4/2024 | Mei | H04L 27/261 |
| 2024/0146447 A1* | 5/2024 | Hu | H04L 1/00 |

* cited by examiner

*Primary Examiner* — Jael M Ulysse
(74) *Attorney, Agent, or Firm* — QUALCOMM Incorporated

(57) ABSTRACT

Methods, systems, and devices for wireless communications are described. A first wireless device may receive a signal including multiple sets of bits, where each set of bits of the multiple sets of bits is associated with either a first group or a second group based on a respective modulation index for each set of bits. Each set of bits may map to one or more additional bits based on an association of each set of bits with the first group, the second group, or both. The first wireless device may decode either or both of a first message formed at least partially by the one or more additional bits or a second message formed at least partially by respective sets of bits associated with the second group. Each of the first and second messages may be for different channels or for different wireless devices.

30 Claims, 13 Drawing Sheets

MULTIPLEXING TECHNIQUES USING ORTHOGONAL FREQUENCY-DIVISION MULTIPLEXING (OFDM) INDEX MODULATION

FIELD OF TECHNOLOGY

The following relates to wireless communications, including multiplexing techniques using orthogonal frequency-division multiplexing (OFDM) index modulation.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE). As the quantity of messages transmitted between wireless devices increases, including messages sent to multiple wireless devices from one transmitter, the quantity of resources used to transmit those messages may also increase. Techniques that enable a relatively greater quantity of messages to be transmitted with fewer resources may increase the efficiency of wireless communications.

SUMMARY

The described techniques relate to improved methods, systems, devices, and apparatuses that support multiplexing techniques using orthogonal frequency-division multiplexing (OFDM) index modulation. For example, the described techniques provide for a single index-modulated transmission to convey multiple messages for different channels and/or different wireless devices. For instance, a first wireless device may receive a signal including multiple sets of bits, where each set of bits of the multiple sets of bits is associated with either a first group or a second group based on a respective modulation index for each set of bits. In some aspects, each set of bits of the multiple sets of bits maps to one or more additional bits based on an association of each set of bits with the first group, the second group, or both. The first wireless device may decode either or both of a first message formed at least partially by the one or more additional bits or a second message formed at least partially by respective sets of bits associated with the second group. Each of the first and second messages may be for different channels or for different wireless devices.

A method for wireless communication at a first wireless device is described. The method may include receiving a signal including multiple sets of bits, where each set of bits of the multiple sets of bits is associated with either a first group or a second group based on a respective modulation index for each set of bits, and where each set of bits of the multiple sets of bits maps to one or more additional bits based on an association of each set of bits with the first group, the second group, or both, and decoding both a first message and a second message, where the first message is associated with a first channel and formed at least partially by the one or more additional bits, and where the second message is associated with a second channel different from the first channel and formed at least partially by respective sets of bits of the multiple sets of bits associated with the second group.

An apparatus for wireless communication at a first wireless device is described. The apparatus may include a processor, memory coupled with the processor, and instructions stored in the memory. The instructions may be executable by the processor to cause the apparatus to receive a signal including multiple sets of bits, where each set of bits of the multiple sets of bits is associated with either a first group or a second group based on a respective modulation index for each set of bits, and where each set of bits of the multiple sets of bits maps to one or more additional bits based on an association of each set of bits with the first group, the second group, or both, and decode both a first message and a second message, where the first message is associated with a first channel and formed at least partially by the one or more additional bits, and where the second message is associated with a second channel different from the first channel and formed at least partially by respective sets of bits of the multiple sets of bits associated with the second group.

Another apparatus for wireless communication at a first wireless device is described. The apparatus may include means for receiving a signal including multiple sets of bits, where each set of bits of the multiple sets of bits is associated with either a first group or a second group based on a respective modulation index for each set of bits, and where each set of bits of the multiple sets of bits maps to one or more additional bits based on an association of each set of bits with the first group, the second group, or both, and means for decoding both a first message and a second message, where the first message is associated with a first channel and formed at least partially by the one or more additional bits, and where the second message is associated with a second channel different from the first channel and formed at least partially by respective sets of bits of the multiple sets of bits associated with the second group.

A non-transitory computer-readable medium storing code for wireless communication at a first wireless device is described. The code may include instructions executable by a processor to receive a signal including multiple sets of bits, where each set of bits of the multiple sets of bits is associated with either a first group or a second group based on a respective modulation index for each set of bits, and where each set of bits of the multiple sets of bits maps to one or more additional bits based on an association of each set of bits with the first group, the second group, or both, and decode both a first message and a second message, where the first message is associated with a first channel and formed at least partially by the one or more additional bits, and where the second message is associated with a second channel different from the first channel and formed at least partially by respective sets of bits of the multiple sets of bits associated with the second group.

In some examples of the method, apparatuses, and non-transitory computer-readable medium described herein, the second message may be formed by respective sets of bits of the multiple sets of bits associated with the first group and the respective sets of bits associated with the second group.

In some examples of the method, apparatuses, and non-transitory computer-readable medium described herein, the first message may be formed by respective sets of bits of the multiple sets of bits associated with the first group and the one or more additional bits.

Some examples of the method, apparatuses, and non-transitory computer-readable medium described herein may further include operations, features, means, or instructions for receiving control signaling indicating a parameter, where the parameter indicates to form the first message at least partially by respective sets of bits of the multiple sets of bits associated with the first group when the parameter may have a first value, and where the parameter indicates to form the second message at least partially by respective sets of bits of the multiple sets of bits associated with the first group when the parameter may have a second value distinct from the first value.

In some examples of the method, apparatuses, and non-transitory computer-readable medium described herein, each set of bits of the multiple sets of bits may be received over a distinct subcarrier, a distinct slot, a distinct spatial stream, a distinct channel state, or any combination thereof.

In some examples of the method, apparatuses, and non-transitory computer-readable medium described herein, an ordering of the one or more additional bits may be based on an index for the distinct subcarrier, the distinct slot, the distinct spatial stream, the distinct channel state, or the any combination thereof over which each set of bits of the multiple sets of bits may be output.

In some examples of the method, apparatuses, and non-transitory computer-readable medium described herein, the first group may be associated with a first set of constellation values and the second group may be associated with a second set of constellation values, the first set of constellation values being orthogonal to the second set of constellation values.

In some examples of the method, apparatuses, and non-transitory computer-readable medium described herein, the first channel includes one of a data channel or a control channel and the second channel includes the other of the data channel or the control channel.

A method for wireless communication at a first wireless device is described. The method may include receiving a signal including multiple sets of bits, where each set of bits of the multiple sets of bits is associated with either a first group or a second group based on a respective modulation index for each set of bits, and where each set of bits of the multiple sets of bits maps to one or more additional bits based on an association of each set of bits with the first group, the second group, or both and decoding either a first message or a second message, where the first message is formed at least partially by the one or more additional bits, where the second message is formed at least partially by respective sets of bits of the multiple sets of bits associated with the second group, and where the first message is for one of the first wireless device or a second wireless device and the second message is for the other of the first wireless device or the second wireless device.

An apparatus for wireless communication at a first wireless device is described. The apparatus may include a processor, memory coupled with the processor, and instructions stored in the memory. The instructions may be executable by the processor to cause the apparatus to receive a signal including multiple sets of bits, where each set of bits of the multiple sets of bits is associated with either a first group or a second group based on a respective modulation index for each set of bits, and where each set of bits of the multiple sets of bits maps to one or more additional bits based on an association of each set of bits with the first group, the second group, or both and decode either a first message or a second message, where the first message is formed at least partially by the one or more additional bits, where the second message is formed at least partially by respective sets of bits of the multiple sets of bits associated with the second group, and where the first message is for one of the first wireless device or a second wireless device and the second message is for the other of the first wireless device or the second wireless device.

Another apparatus for wireless communication at a first wireless device is described. The apparatus may include means for receiving a signal including multiple sets of bits, where each set of bits of the multiple sets of bits is associated with either a first group or a second group based on a respective modulation index for each set of bits, and where each set of bits of the multiple sets of bits maps to one or more additional bits based on an association of each set of bits with the first group, the second group, or both and means for decoding either a first message or a second message, where the first message is formed at least partially by the one or more additional bits, where the second message is formed at least partially by respective sets of bits of the multiple sets of bits associated with the second group, and where the first message is for one of the first wireless device or a second wireless device and the second message is for the other of the first wireless device or the second wireless device.

A non-transitory computer-readable medium storing code for wireless communication at a first wireless device is described. The code may include instructions executable by a processor to receive a signal including multiple sets of bits, where each set of bits of the multiple sets of bits is associated with either a first group or a second group based on a respective modulation index for each set of bits, and where each set of bits of the multiple sets of bits maps to one or more additional bits based on an association of each set of bits with the first group, the second group, or both and decode either a first message or a second message, where the first message is formed at least partially by the one or more additional bits, where the second message is formed at least partially by respective sets of bits of the multiple sets of bits associated with the second group, and where the first message is for one of the first wireless device or a second wireless device and the second message is for the other of the first wireless device or the second wireless device.

In some examples of the method, apparatuses, and non-transitory computer-readable medium described herein, the second message may be formed by respective sets of bits of the multiple sets of bits associated with the first group and the respective sets of bits associated with the second group.

In some examples of the method, apparatuses, and non-transitory computer-readable medium described herein, the first message may be formed by respective sets of bits of the multiple sets of bits associated with the first group and the one or more additional bits.

Some examples of the method, apparatuses, and non-transitory computer-readable medium described herein may further include operations, features, means, or instructions for receiving control signaling indicating a parameter, where the parameter indicates to form the first message at least partially by respective sets of bits of the multiple sets of bits associated with the first group when the parameter may have a first value, and where the parameter indicates to form the second message at least partially by respective sets of bits of the multiple sets of bits associated with the first group when the parameter may have a second value distinct from the first value.

In some examples of the method, apparatuses, and non-transitory computer-readable medium described herein, each set of bits of the multiple sets of bits may be received over a distinct subcarrier, a distinct slot, a distinct spatial stream, a distinct channel state, or any combination thereof.

In some examples of the method, apparatuses, and non-transitory computer-readable medium described herein, an ordering of the one or more additional bits may be based on an index for the distinct subcarrier, the distinct slot, the distinct spatial stream, the distinct channel state, or the any combination thereof over which each set of bits of the multiple sets of bits may be output.

In some examples of the method, apparatuses, and non-transitory computer-readable medium described herein, the first group may be associated with a first set of constellation values and the second group may be associated with a second set of constellation values, the first set of constellation values being orthogonal to the second set of constellation values.

A method for wireless communication at a first wireless device is described. The method may include determining multiple sets of bits to output via a signal, where each set of bits of the multiple sets of bits is associated with a first group or a second group based on a respective modulation index for each set of bits, and where each set of bits of the multiple sets of bits maps to one or more additional bits based on an association of each set of bits of the multiple sets of bits with the first group, the second group, or both and outputting the signal including a first message, or a second message, or both, where the first message is formed at least partially by the one or more additional bits, where the second message is formed at least partially by respective sets of bits of the multiple sets of bits associated with the second group, where the first message is associated with a first channel, a second wireless device, or both, and where the second message is associated with a second channel, a third wireless device, or both.

An apparatus for wireless communication at a first wireless device is described. The apparatus may include a processor, memory coupled with the processor, and instructions stored in the memory. The instructions may be executable by the processor to cause the apparatus to determine multiple sets of bits to output via a signal, where each set of bits of the multiple sets of bits is associated with a first group or a second group based on a respective modulation index for each set of bits, and where each set of bits of the multiple sets of bits maps to one or more additional bits based on an association of each set of bits of the multiple sets of bits with the first group, the second group, or both and output the signal including a first message, or a second message, or both, where the first message is formed at least partially by the one or more additional bits, where the second message is formed at least partially by respective sets of bits of the multiple sets of bits associated with the second group, where the first message is associated with a first channel, a second wireless device, or both, and where the second message is associated with a second channel, a third wireless device, or both.

Another apparatus for wireless communication at a first wireless device is described. The apparatus may include means for determining multiple sets of bits to output via a signal, where each set of bits of the multiple sets of bits is associated with a first group or a second group based on a respective modulation index for each set of bits, and where each set of bits of the multiple sets of bits maps to one or more additional bits based on an association of each set of bits of the multiple sets of bits with the first group, the second group, or both and means for outputting the signal including a first message, or a second message, or both, where the first message is formed at least partially by the one or more additional bits, where the second message is formed at least partially by respective sets of bits of the multiple sets of bits associated with the second group, where the first message is associated with a first channel, a second wireless device, or both, and where the second message is associated with a second channel, a third wireless device, or both.

A non-transitory computer-readable medium storing code for wireless communication at a first wireless device is described. The code may include instructions executable by a processor to determine multiple sets of bits to output via a signal, where each set of bits of the multiple sets of bits is associated with a first group or a second group based on a respective modulation index for each set of bits, and where each set of bits of the multiple sets of bits maps to one or more additional bits based on an association of each set of bits of the multiple sets of bits with the first group, the second group, or both and output the signal including a first message, or a second message, or both, where the first message is formed at least partially by the one or more additional bits, where the second message is formed at least partially by respective sets of bits of the multiple sets of bits associated with the second group, where the first message is associated with a first channel, a second wireless device, or both, and where the second message is associated with a second channel, a third wireless device, or both.

In some examples of the method, apparatuses, and non-transitory computer-readable medium described herein, the second message may be formed by respective sets of bits of the multiple sets of bits associated with the first group and the respective sets of bits associated with the second group.

In some examples of the method, apparatuses, and non-transitory computer-readable medium described herein, the first message may be formed by respective sets of bits of the multiple sets of bits associated with the first group and the one or more additional bits.

In some examples of the method, apparatuses, and non-transitory computer-readable medium described herein, outputting control signaling indicating a parameter, where the parameter indicates to form the first message at least partially by respective sets of bits of the multiple sets of bits associated with the first group when the parameter may have a first value, and where the parameter indicates to form the second message at least partially by respective sets of bits of the multiple sets of bits associated with the first group when the parameter may have a second value distinct from the first value.

In some examples of the method, apparatuses, and non-transitory computer-readable medium described herein, each set of bits of the multiple sets of bits may be output over a distinct subcarrier, a distinct slot, a distinct spatial stream, a distinct channel state, or any combination thereof.

In some examples of the method, apparatuses, and non-transitory computer-readable medium described herein, an ordering of the one or more additional bits may be based on an index for the distinct subcarrier, the distinct slot, the distinct spatial stream, the distinct channel state, or the any combination thereof over which each set of bits of the multiple sets of bits may be output.

In some examples of the method, apparatuses, and non-transitory computer-readable medium described herein, the first group may be associated with a first set of constellation values and the second group may be associated with a second set of constellation values, the first set of constellation values being orthogonal to the second set of constellation values.

In some examples of the method, apparatuses, and non-transitory computer-readable medium described herein, the first channel includes one of a data channel or a control channel and the second channel includes the other of the data channel or the control channel.

DETAILED DESCRIPTION

Figure 1:
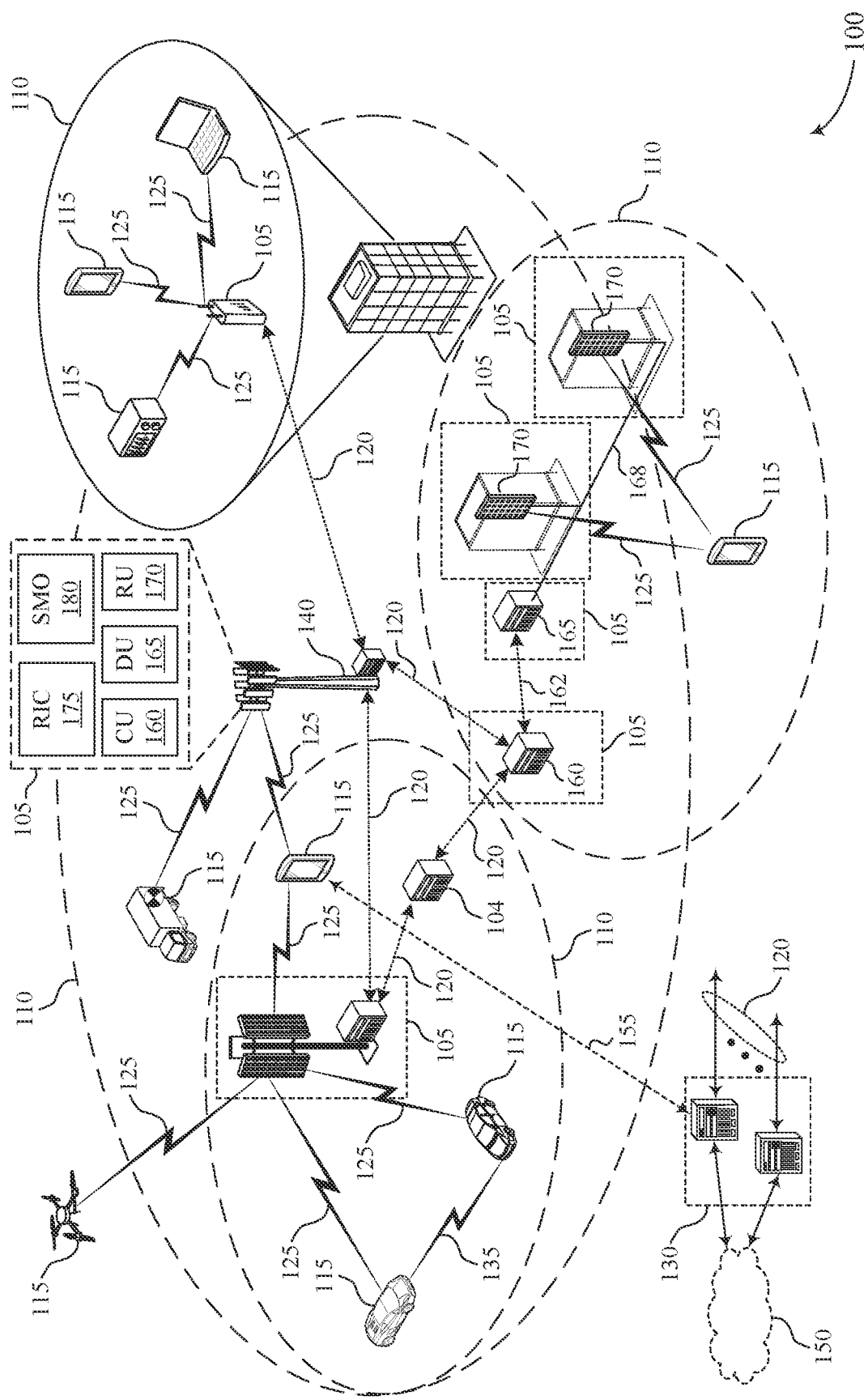
FIG. 1 illustrates an example of a wireless communications system that supports multiplexing techniques using orthogonal frequency-division multiplexing (OFDM) index modulation in accordance with one or more aspects of the present disclosure.

In some wireless communications systems, one or more wireless devices may use index modulation for transmissions to other devices. As one example (e.g., multi-mode index modulation), a bit stream to be transmitted to another wireless device may be split into respective sets of bits, with a first set of bits being signaled based on an index associated with a second set of bits. In particular, the first set of bits may be implicitly conveyed in accordance with the index, whereas the second set of bits may be transmitted on resources and may be further split into two or more groups of bits. Here, each of the two or more groups of bits may have bits that are orthogonal to one another based on one or more modulation schemes (e.g., respective orthogonal frequency-division multiplexing (OFDM) subcarriers may include modulation symbols associated with different groups, and the modulation symbols for each group may be orthogonal). Index modulation may be implemented using various schemes, and index modulation techniques may generally include, for example, multi-mode index modulation (MM-IM), spatial-domain index modulation (SD-IM), time-domain index modulation (TD-IM), frequency-domain index modulation (FD-IM), and single-carrier-based index modulation (SC-IM), among other examples. In any case, index modulation techniques may provide improved spectral efficiency of a transmitted signal by conveying additional information based on how some bits are transmitted to another device (e.g., the resources used for the transmission may signal additional information on top of the bits mapped to the resources and transmitted to the other device).

As an example of multi-mode OFDM index modulation (MM-OFDM-IM), information may be transmitted by a first wireless device via different sets of bits (e.g., a first set of bits that may be referred to as Part 1 bits, and a second set of bits that may be referred to as Part 2 bits). For instance, the first wireless device may convey the second set of bits via a modulation scheme employing orthogonality (e.g., an amplitude phase modulation (APM) scheme) and may (e.g., implicitly) convey a first set of bits based on how the second set of bits are mapped to resources and/or transmitted. Here, the second set of bits may include multiple sets of bits, where each of the multiple sets of bits is associated with a respective subcarrier, a respective time slot, a respective antenna, a respective channel state, or a combination thereof, which may map to a respective index. Accordingly, each of the multiple sets of bits may map to a different index (e.g., a different subcarrier index when each of the multiple sets of bits is associated with a respective subcarrier). In addition, the second set of bits may be associated with two or more groups of bits that may correspond to different resources of the transmission. Using a value of this index and a property of the modulation scheme for conveying the first set of bits, the second wireless device may derive the first set of bits. For instance, using a value of the index and a respective modulation symbol for a set of the multiple sets of bits, the second wireless device may determine one or more bits of the first set of bits.

In some examples, after deriving the first set of bits and the second set of bits, the second wireless device may combine the first set of bits and the second set of bits into a single message. However, using the first set of bits and the second set of bits solely for deriving a single message may limit the applications of index modulation in wireless communications systems that perform communications over more than one channel and/or multi-device communications. For instance, to transmit a message for a first channel and a second, different channel, the first wireless device may transmit two or more separate transmissions. Likewise, to transmit messages to multiple devices (e.g., respective messages to the second wireless device and a third wireless device), two or more separate transmissions may be used. As the quantity of transmissions that the first wireless device conveys increases, more resources may be utilized and the efficiency of wireless communications may decrease.

To enable efficient usage of the wireless spectrum, the techniques described herein may enable the first wireless device to convey information for multiple channels and/or to multiple wireless devices in a single transmission using index modulation. That is, the first wireless device may multiplex information for multiple channels and/or users in a single transmission using index modulation. For instance, in a first index modulation scheme, the first set of bits may include a first message for a first channel and/or a second wireless device, and the second set of bits may include a second message for the second channel and/or a third wireless device. Alternatively, in a second modulation scheme, the first set of bits and a portion of the second set of bits may be a first message for the first channel and/or the second wireless device, and the remaining portion of the second set of bits may be a second message for the second channel and/or the third wireless device. In some examples, whether a wireless device uses the first modulation scheme or the second modulation scheme may be configured via control signaling (e.g., dynamic control signaling or semi-static control signaling).

Aspects of the disclosure are initially described in the context of wireless communications systems. Additional aspects of the disclosure are described in the context of index modulation schemes and process flows. Aspects of the disclosure are further illustrated by and described with reference to apparatus diagrams, system diagrams, and flowcharts that relate to multiplexing techniques using OFDM index modulation.

FIG. 1 illustrates an example of a wireless communications system 100 that supports multiplexing techniques using OFDM index modulation in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support multiplexing techniques using OFDM index modulation as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s = 1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHZ, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

In some examples, a first wireless device (e.g., a UE 115, a network entity 105) may convey information to a second wireless device (e.g., a UE 115, a network entity 105) using index modulation, which may include a bit stream that is separated into a first set of bits and a second set of bits. For instance, the first wireless device may convey a second set of bits via a modulation scheme employing orthogonality (e.g., an APM scheme) and may convey a first set of bits based on how the second set of bits are conveyed. In some examples, the second set of bits may be made up of multiple sets of bits, where each set of the multiple sets of bits is associated with a respective subcarrier, a respective time slot, a respective antenna, a respective channel state, or a combination thereof which may map to a respective index. Accordingly, each set of the multiple sets of bits may map to a different index (e.g., a different subcarrier index when each of the multiple sets of bits is associated with a respective subcarrier). Using a value of this index and a property of the modulation scheme for conveying the second set of bits, the second wireless device may derive the first set of bits. For instance, using a value of the index and a respective modulation symbol for a set of the multiple sets of bits, the second wireless device may determine one or more bits of the first set of bits.

In some examples, after deriving the first set of bits and the second set of bits, the second wireless device may combine the first set of bits and the second set of bits into a single message. However, using the first set of bits and the second set of bits solely for deriving a single message may limit the applications of index modulation in wireless communications systems that perform communications over more than one channel and/or multi-device communications. For instance, to transmit a message for a first channel and a second channel and/or for the second wireless device and a third wireless device (e.g., a UE 115, a network entity 105), the first wireless device may transmit two or more separate transmissions. As the quantity of transmissions that the first wireless device conveys increases, relatively more resources may be utilized and the efficiency of wireless communications may decrease.

To enable more efficient usage of the wireless spectrum, the techniques described herein may enable the first wireless device to convey information for multiple channels and/or multiple wireless devices in a single transmission using index modulation. For instance, in a first index modulation scheme, the first set of bits may be a first message for the first channel and/or the second wireless device and the second set of bits may be a second message for the second channel and/or the third wireless device. Alternatively, in a second modulation scheme, the first set of bits and a portion of the second set of bits may be a first message for the first channel and/or the second wireless device and the remaining portion of the second set of bits may be a second message for the second channel and/or the third wireless device. In some examples, whether a wireless device uses the first modulation scheme or the second modulation scheme may be configured via control signaling (e.g., dynamic control signaling or semi-static control signaling). The described techniques may enable multiplexing of multiple messages associated with different channels and/or devices using index modulation, which may enable increased spectral efficiency for wireless communications.

Figure 2A:
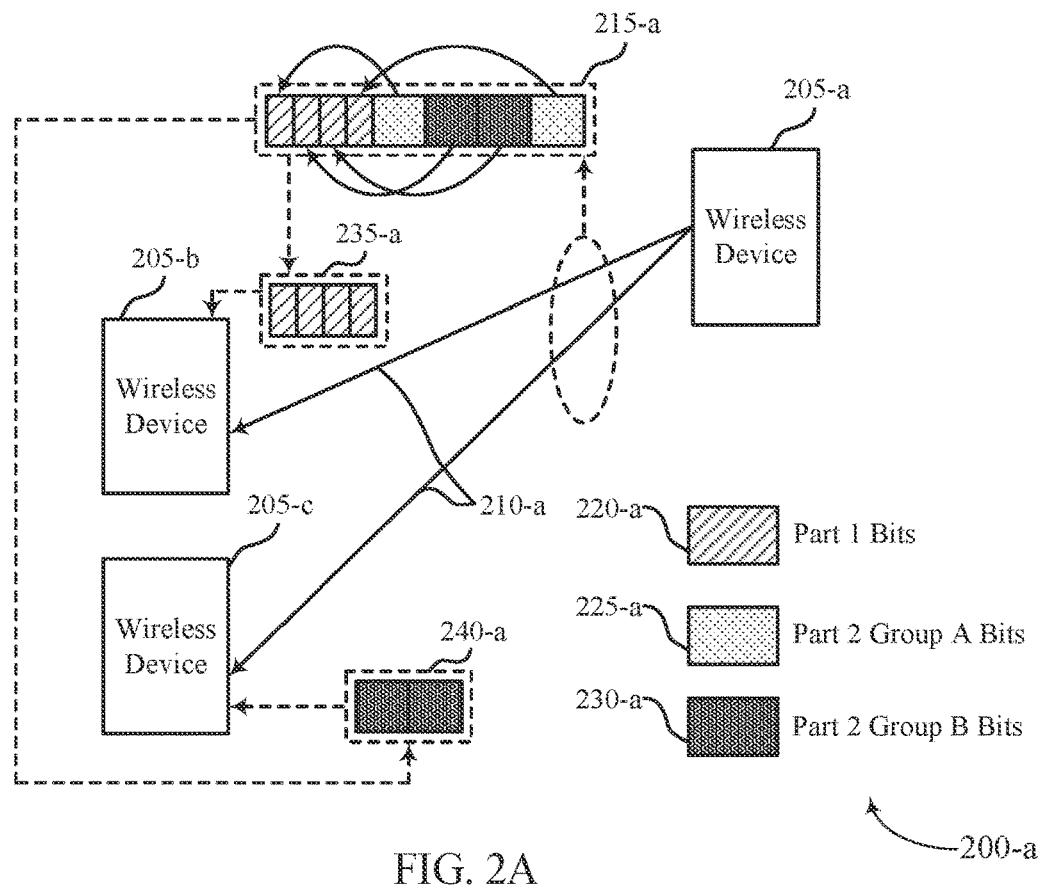
FIGS. 2A and 2B illustrate examples of wireless communications systems that support multiplexing techniques using OFDM index modulation in accordance with one or more aspects of the present disclosure.

FIG. 2A illustrates an example of a wireless communications system 200-a that supports multiplexing techniques using OFDM index modulation in accordance with one or more aspects of the present disclosure. In some examples, wireless communications system 200-a may implement one or more aspects of wireless communications system 100. For instance, wireless devices 205-a, 205-b, and 205-c may each be an example of a UE 115 or a network entity 105 as described with reference to FIG. 1.

First wireless device 205-a may determine information 215-a to encode in a signal 210-a. For instance, first wireless device 205-a may determine multiple sets of bits, which may be referred to as Part 2 bits, to output via signal 210-b, where each of the sets of bits are associated with one of multiple groups of bits (e.g., a first group or a second group). A first group of sets of bits 225-a may be associated with Group A and a second group of sets of bits 230-a may be associated with Group B. Whether a set of bits of the multiple sets of bits is in (e.g., associated with) Group A or Group B may be based on a respective modulation index for the set of bits. For instance, if a modulation index of the set of bits is within a first range of values (e.g., 0-3), the set of bits may be in Group A, and if the modulation index of the set of bits is within a second range of values (e.g., 4-7), the set of bits may be in Group B. In some examples, the multiple sets of bits may map to one or more additional bits 220-a, which may be referred to as Part 1 bits, based on an association of each set of bits of the multiple sets of bits with the first group, the second group, or both. For instance, if a set of bits of the multiple sets of bits is in Group A, the set of bits may map to a first bit value (e.g., 0) for the one or more additional bits 220-a, and if the set of bits of the multiple sets of bits is in Group B, the set of bits may map to a second bit value (e.g., 1) for the one or more additional bits 220-a. In some examples, the first group of sets of bits 225-a may be associated with a first set of constellation values and the second group of sets of bits 230-a may be associated with a second set of constellation values. In some such examples, the first set of constellation values may be orthogonal to the second set of constellation values. In some examples, a location within the Part 1 bits that a set of bits of the multiple sets of bits map to may depend on an index associated with the set of bits. For instance, if each of the set of bits has an associated subcarrier index, then a set of bits whose subcarrier index has a value of 0 may map to a bit of the one or more additional bits 220-a with a position 0.

First wireless device 205-a may transmit the signal 210-a to second wireless device 205-b and third wireless device 205-c. Second wireless device 205-b, after receiving signal 210-a, may decode a first message 235-a, where the first message is formed at least partially by the one or more additional bits 220-a (e.g., Part 1 bits). Third wireless device 205-c, after receiving signal 210-a, may decode a second message 240-a, where the second message is formed at least partially by respective sets of bits of the multiple sets of bits associated with Group B (e.g., the second group of sets of bits 230-a). In a first modulation scheme, second message 240-a may be formed by each of the multiple sets of bits (e.g., the first group of sets of bits 225-a and the second group of sets of bits 230-a). In some such examples, first message 235-a may include the one or more additional bits 220-a (e.g., the Part 1 bits). In a second modulation scheme, first message 235-a may be formed by the one or more additional bits 220-a (e.g., the Part 1 bits) and the respective sets of bits of the multiple sets of bits associated with Group A (e.g., the first group of sets of bits 225-a). In some such examples, second message 240-a may include the respective sets of bits of the multiple sets of bits associated with Group B (e.g., the second group of sets of bits 230-a).

In some examples, second wireless device 205-b and/or third wireless device 205-c may receive control signaling (e.g., from first wireless device 205-a) indicating a parameter indicating for second wireless device 205-b and/or third wireless device 205-c to use the first modulation scheme or the second modulation scheme. In some such examples, the control signaling may be transmitted depending on the data (e.g., if first wireless device 205-a is to increase or decrease a quantity of bits sent per wireless device). In some examples, the control signaling may be sent dynamically or semi-statically.

Figure 2B:
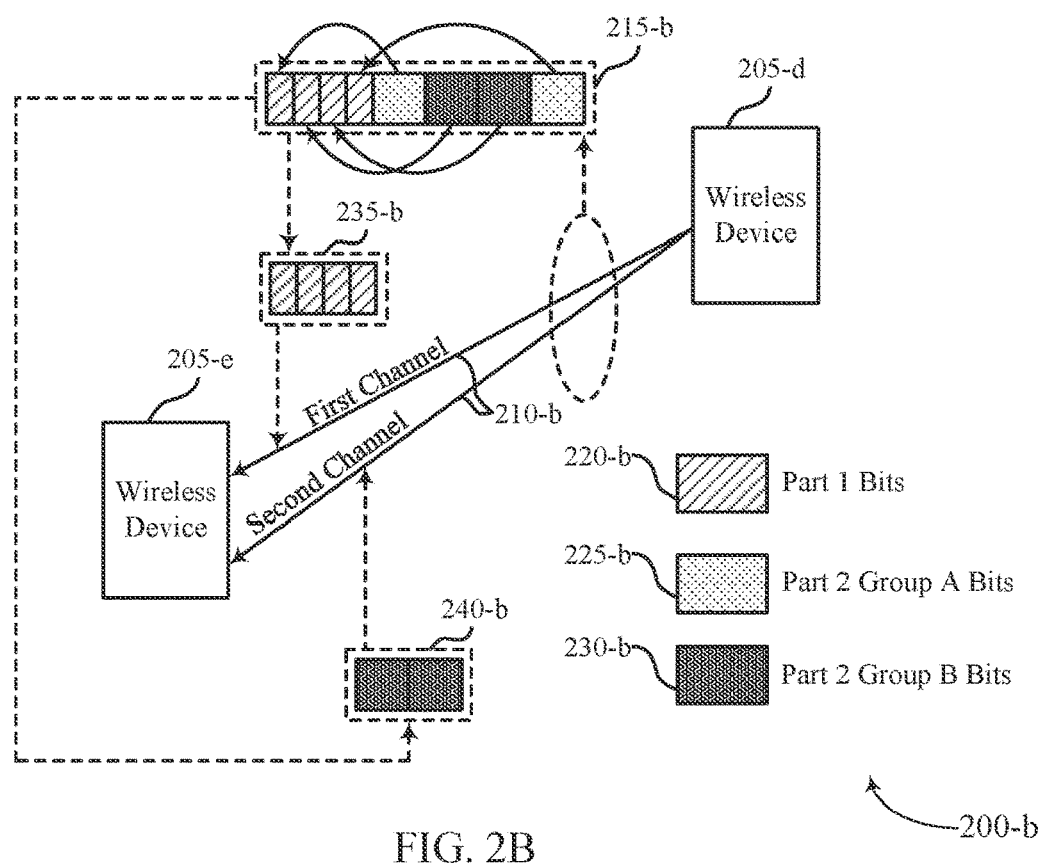

FIG. 2B illustrates an example of a wireless communications system 200-b that supports multiplexing techniques using OFDM index modulation in accordance with one or more aspects of the present disclosure. In some examples, wireless communications system 200-b may implement one or more aspects of wireless communications system 100. For instance, wireless devices 205-d and 205-e may each be an example of a UE 115 or a network entity 105 as described with reference to FIG. 1.

In some examples, first wireless device 205-d may determine information 215-b to encode in a signal 210-b. For instance, first wireless device 205-d may determine multiple sets of bits, which may be referred to as Part 2 bits, to output via signal 210-b, where each of the sets of bits are associated with a first group or a second group. For instance, a first group of sets of bits 225-b may be in Group A and a second group of sets of bits 230-b may be in Group B. Whether a set of bits of the multiple sets of bits is associated with Group A or Group B may be based on a respective modulation index for the set of bits. For instance, if a modulation index of the set of bits is within a first range of values (e.g., 0-3), the set of bits may be in Group A, and if the modulation index of the set of bits is within a second range of values (e.g., 4-7), the set of bits may be in Group B. The multiple sets of bits may map to one or more additional bits 220-b, which may be referred to as Part 1 bits, based on an association of each set of bits of the multiple sets of bits with the first group, the second group, or both. For instance, if a set of bits of the multiple sets of bits is in Group A, the set of bits may map to a first bit value (e.g., 0) for the one or more additional bits 220-b, and if the set of bits of the multiple sets of bits is in Group B, the set of bits may map to a second bit value (e.g., 1) for the one or more additional bits 220-b. In some examples, the first group of sets of bits 225-b may be associated with a first set of constellation values and the second group of sets of bits 230-b may be associated with a second set of constellation values. In some such examples, the first set of constellation values may be orthogonal to the second set of constellation values. In some examples, a location or portion within the Part 1 bits that a set of bits of the multiple sets of bits maps to may be based on an index associated with the set of bits. For instance, if each of the set of bits has an associated subcarrier index, then a set of bits whose subcarrier index has a value of 0 may map to a bit of the one or more additional bits 220-b with a position 0.

First wireless device 205-d may transmit the signal 210-b to second wireless device 205-e. Second wireless device 205-e, based on receiving signal 210-b, may decode a first message 235-*b* formed at least partially by the one or more additional bits 220-*b* (e.g., Part 1 bits) for a first channel and may decode a second message 240-*b* formed at least partially by respective sets of bits of the multiple sets of bits associated with Group B (e.g., the second group of sets of bits 230-*b*) for a second channel. In a first modulation scheme, second message 240-*b* may be formed by each of the multiple sets of bits (e.g., the first group of sets of bits 225-*b* and the second group of sets of bits 230-*b*). In some such examples, first message 235-*b* may include only the one or more additional bits 220-*b* (e.g., the Part 1 bits). In a second modulation scheme, first message 235-*b* may be formed by the one or more additional bits 220-*b* (e.g., the Part 1 bits) and the respective sets of bits of the multiple sets of bits associated with Group A (e.g., the first group of sets of bits 225-*b*). In some such examples, second message 240-*b* may include only the respective sets of bits of the multiple sets of bits associated with Group B (e.g., the second group of sets of bits 230-*a*). In some examples, one of the first channel and the second channel may be a data channel and the other of the first channel and the second channel may be a control channel.

First wireless device 205-*d* may receive control signaling (e.g., from first wireless device 205-*d*) indicating a parameter indicating for second wireless device 205-*e* to use the first modulation scheme or the second modulation scheme. In some such examples, the control signaling may be transmitted depending on the data (e.g., if first wireless device 205-*d* is to increase or decrease a quantity of bits sent per channel). In some examples, the control signaling may be sent dynamically or semi-statically.

In some examples (e.g., in either or both of FIG. 2A or FIG. 2B), each set of bits of the multiple sets of bits (e.g., the Part 2 bits) may be received over a distinct subcarrier, a distinct slot, a distinct spatial stream, a distinct channel state, or any combination thereof. In some such examples, the one or more additional bits 220-*a* or 220-*b* (e.g., the Part 1 bits) may be conveyed implicitly by an index usage or activation patterns of source-based index modulation (SBIM) or media-based modulation (MBM). For instance, in FD-IM, each set of bits of the multiple sets of bits may be received over a distinct subcarrier and may thus have a distinct subcarrier index. Additionally, or alternatively, in spatial-domain index modulation, each set of bits of the multiple sets of bits may be received from a distinct antenna and may thus have a distinct antenna index. Additionally, or alternatively, in TD-IM, each set of bits of the multiple sets of bits may be received over a distinct time slot and may thus have a distinct slot index. Additionally, or alternatively, in channel-domain index modulation (CD-IM), each set of bits of the multiple sets of bits may be associated with a distinct channel state and may thus have a distinct channel state index. In some examples, each of the multiple sets of bits (e.g., the Part 2 bits) may be modulated using an APM scheme or another means or orthogonality. In the techniques described herein, a subset of resources (e.g., certain subcarriers, antennas, time slots, or channel states) may be used for a transmission, whereas others may be unused by the associated transmission. In such examples, the additional one or more information bits (e.g., the Part 1 bits) may be conveyed implicitly by the index usage or activation parameters.

In some cases (e.g., in either or both of FIG. 2A or FIG. 2B), more than two groups may be present. In some such examples, a set of bits of the multiple sets of bits may map to multiple of the one or more additional bits 220-*a* or 220-*b* (e.g., the Part 1 bits). For instance, if Group A is associated with sets of bits with modulation symbols in a first range (e.g., 0-1); Group B is associated with sets of bits with modulation symbols in a second range (e.g., 2-3); Group C is associated with sets of bits with modulation symbols in a third range (e.g., 4-5); and Group D is associated with sets of bits with modulation symbols in a fourth range (e.g., 6-7), bit sets of Group A may map to a first bit value (e.g., 00) of the one or more additional bits, bit sets of Group B may map to a second bit value (e.g., 01) of the one or more additional bits, bit sets of Group C may map to a third bit value (e.g., 10) of the one or more additional bits, and bit sets of Group D may map to a fourth bit value (e.g., 11) of the one or more additional bits.

In some examples (e.g., in either or both of FIG. 2A or FIG. 2B), the one or more additional bits 220-*a* or 220-*b* (e.g., the Part 1 bits) may map to sub-blocks for the multiple sets of bits. For instance, if there are 16 sets of bits and each sub-block includes 4 set of bits, then there may be 4 sub-blocks. Depending on whether the sets of bits within the sub-block are in Group A or Group B, the sub-block may map to different values for the one or more additional bits. For instance, a first pattern for the set of bits in a sub-block (e.g., a first and second sets of bits of a sub-block being in Group A and a third and fourth sets of bits of the sub-block being in Group B) may map to a first bit value (e.g., 00); a second pattern for the set of bits in the sub-block (e.g., the first and fourth sets of bits of the sub-block being in Group B and the second and third sets of bits of the sub-block being in Group A) may map to a second bit value (e.g., 01); a third pattern for the sets of bits in the sub-block (e.g., the first and second sets of bits of a sub-block being in Group B and the third and fourth sets of bits of the sub-block being in Group A) may map to a third bit value (e.g., 10); and a fourth pattern for the sets of bits in the sub-block (e.g., the first and fourth sets of bits of the sub-block being in Group A and the second and third sets of bits of the sub-block being in Group B) may map to a fourth bit value (e.g., 11).

In some cases (e.g., in either or both of FIG. 2A or FIG. 2B), the techniques described herein may be associated with one or more advantages. The techniques described herein may provide for a single index-modulated transmission to convey multiple messages for different channels and/or different wireless devices. For instance, as index modulation (e.g., multi-mode OFDM index modulation (MM-OFDM-IM) may contain multiple orthogonal levels utilized for sending data for more than one receiver (or data for multiple channels), using the same time and frequency resource multi-user or multi-channel OFDM index modulation may be possible. The spectral efficiency gain of performing MM-OFDM-IM may be $\log_2(G)$ bits per subcarrier for FD-IM, where G may be equal to a quantity of groups (e.g., 2 if just Group A and B). Similarly, the spectral efficiency gain may be $\log_2(G)$ bits per slot for TD-IM; $\log_2(G)$ bits per channel state for CD-IM; and $\log_2(G)$ bits per antenna for SBIM. Additionally, performing MM-OFDM-IM for transmissions may enable channels and/or users (e.g., wireless devices) to be parallelized.

Figure 3:
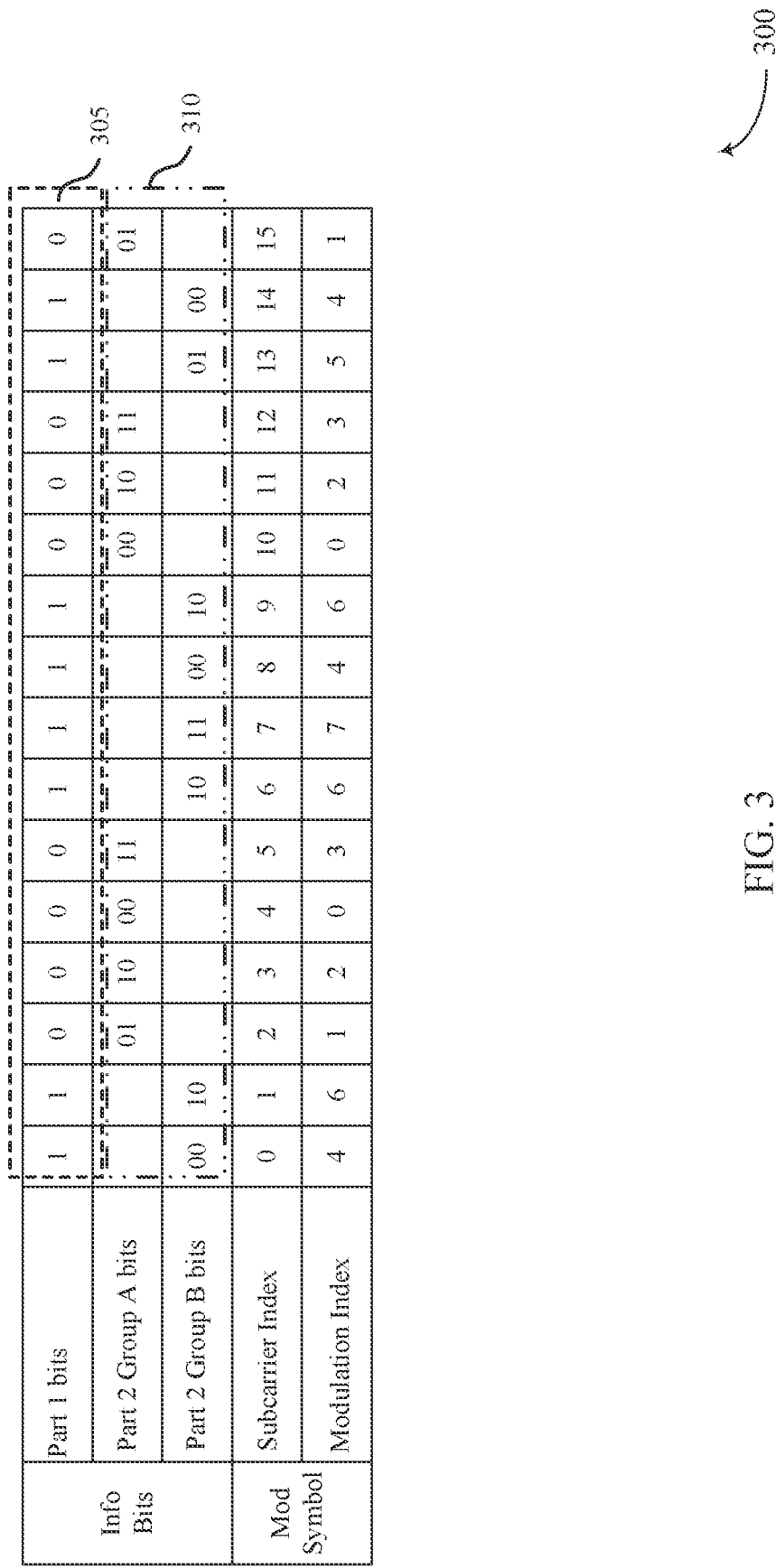
FIG. 3 illustrates an example of an index modulation scheme that supports multiplexing techniques using OFDM index modulation in accordance with one or more aspects of the present disclosure.

FIG. 3 illustrates an example of an index modulation scheme 300 that supports multiplexing techniques using OFDM index modulation in accordance with one or more aspects of the present disclosure. In some examples, index modulation scheme 300 may be implemented by one or more aspects of wireless communications systems 200-*a* and/or 200-*b*. For instance, index modulation scheme 300 may represent a scheme for decoding signal 210-*a* as described with reference to FIG. 2A and/or signal 210-*b* as described with reference to FIG. 2B. (e.g., the first modulation scheme as described with reference to FIGS. 2A and/or 2B). Although the present example is described in the context of subcarriers, the same techniques may be applied for slots, channel states, and/or antennas as described herein.

In some examples, OFDM subcarriers may carry modulation symbols belonging to one out of G groups, where each group has 1 of S possible distinguishable and/or orthogonal modulation symbols (e.g., each group may have a size of log 2 (S) bits). The Part 1 bits may be used to determine the group. For instance, the quantity of Part 1 bits may be $p_1=\lceil \log_2(G) \rceil$ bits per subcarrier. The Part 2 bits may be used to determine the modulation symbol (e.g., within a group). For instance, a total quantity of Part 2 bits may be given by $p_2=\lceil \log_2(S) \rceil$ bits per subcarrier. For L subcarriers, a total quantity of bits carried may thus be $m=L\times(p_1+p_2)$.

Index modulation scheme 300 may depict a table showing a mapping between a group and modulation symbols with L=16, S=4, and G=2. In some examples, to determine a Part 1 bit using index modulation scheme 300, a wireless device may determine whether a corresponding set of Part 2 bits is in Group A or Group B. In the present example, a set of Part 2 bits may be in Group A if the corresponding modulation symbol is within the range 0-3 and may be in Group B if the corresponding modulation symbol is within the range 4-7. For instance, the set of Part 2 bits associated with subcarrier index 0 may have a modulation symbol of 4 and may thus be associated with Group B bits. Additionally, the set of Part 2 bits associated with subcarrier index 2 may have a modulation index of 1 and may thus be associated with Group A bits. If a set of Part 2 bits is included in Group A, its corresponding Part 1 bit may have a value of 0 and, if the set of Part 2 bits is included in Group B, its corresponding Part 1 bit may have a value of 1. Thus, in the present example, the set of Part 2 bits associated with subcarrier index 0 may map to a Part 1 bit with a value of 1 and the set of Part 2 bits associated with subcarrier index 2 may map to a Part 1 bit with a value of 0. However, other schemes for indicating (e.g., implicitly) the Part 1 bits may be used.

The location of a Part 1 bit may be determined by the subcarrier index. For instance, the Part 1 bits may be ordered according to an order of the subcarrier indices (e.g., if subcarrier 0-15 are present, then the Part 1 bits may be aligned with the subcarrier indices to have the form 1100001111000110). The Part 2 bits may be appended to the Part 1 bits and their location may also be determined by the subcarrier index. For instance, the Part 2 bits may have a form 00100110001110110010001010001. The combined form of the Part 1 bits and the Part 2 bits may be 11000011110001100010011000111011001000101010001.

In some examples, index modulation scheme 300 may be used to multiplex information for multiple users and/or multiple channels (e.g., control channels, data channels) using same time and/or frequency resources. For instance, a first wireless device may dedicate the Part 1 bits 305 for transmitting a message via a first channel and/or transmitting a message to a first user (e.g., corresponding to a second wireless device). Further, the first wireless device may dedicate the Part 2 bits 310 for transmitting a message via a second channel and/or transmitting a message to a second user (e.g., corresponding to a third wireless device). The first wireless device may encode the Part 1 bits 305 (e.g., associated with a first message) and Part 2 bits 310 (e.g., associated with a second message) into a signal and transmit the signal. In some examples, a second wireless device may receive the signal and may decode the Part 1 bits 305 for a first channel (e.g., one of a control channel or a data channel) and the Part 2 bits 310 for a second channel (e.g., the other of the control channel or the data channel). In other examples, the second wireless device may receive the signal and may decode one of the Part 1 bits 305 or the Part 2 bits 310 (e.g., in examples in which the other of the Part 1 bits 305 or the Part 2 bits 310 is dedicated to a message for another wireless device). In some such examples, a third wireless device may receive the signal and may decode the other of the Part 1 bits 305 or the Part 2 bits 310. In some cases, the third wireless device may refrain from decoding the one of the Part 1 bits 305 or the Part 2 bits 310 decoded by the second wireless device (e.g., as the one of the Part 1 bits 305 or the Part 2 bits may be dedicated to the second wireless device). In some examples, the second wireless device may decode the one of the Part 1 bits 305 or the Part 2 bits 310 for the first channel and the third wireless device may decode the other of the Part 1 bits 305 or the Part 2 bits 310 for the second channel. Whichever wireless device that decodes the Part 1 bits 305 may decode $L\times\lceil \log 2(G) \rceil$ information bits (e.g., 16 information bits in the present example) and whichever wireless device that decodes the Part 2 bits 310 may decode $L\times \log 2(S)$ information bits (e.g., 32 information bits, in the present example).

Figure 4:
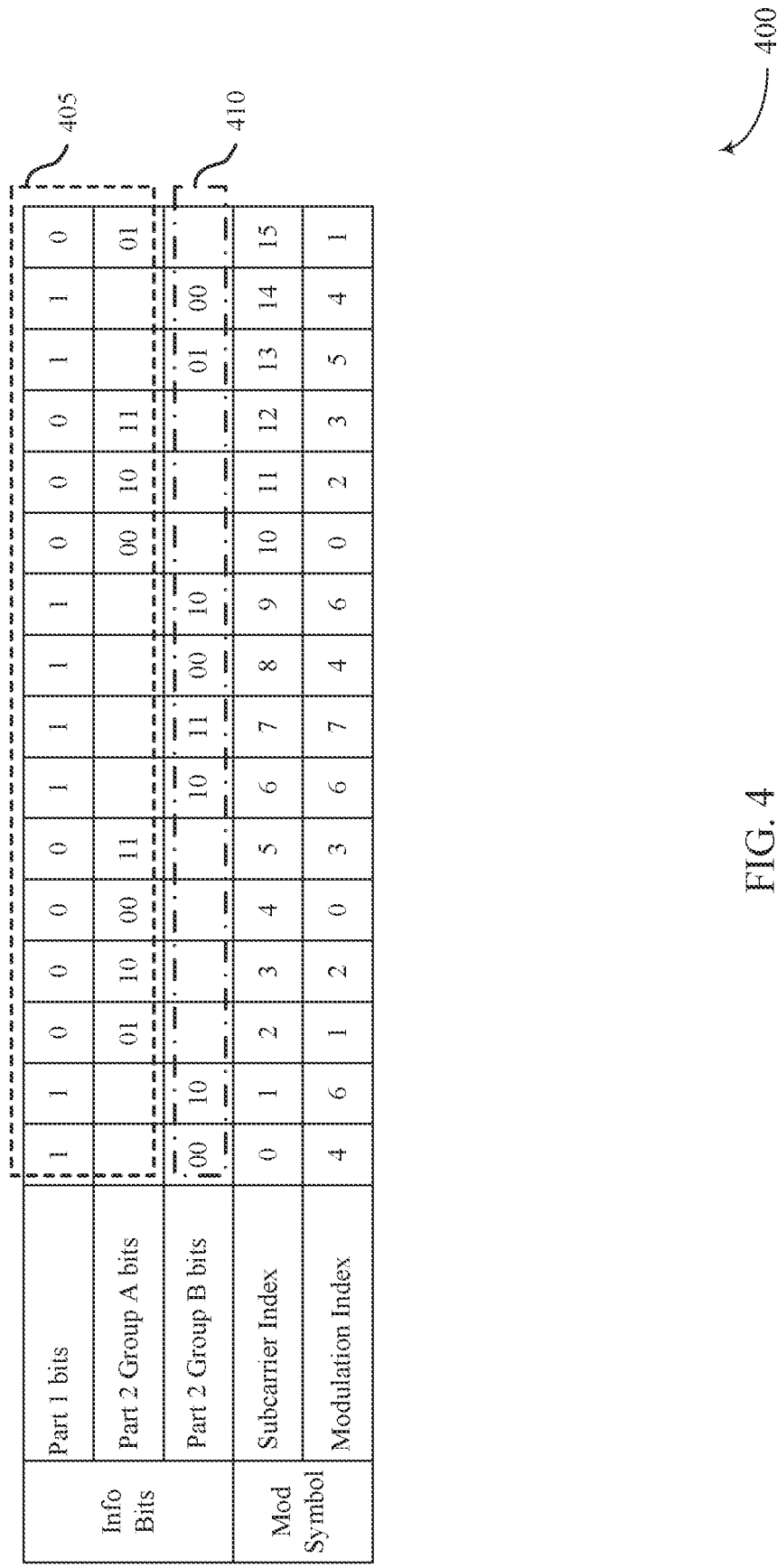
FIG. 4 illustrates an example of an index modulation scheme that supports multiplexing techniques using OFDM index modulation in accordance with one or more aspects of the present disclosure.

FIG. 4 illustrates an example of an index modulation scheme 400 that supports multiplexing techniques using OFDM index modulation in accordance with one or more aspects of the present disclosure. In some examples, index modulation scheme 400 may be implemented by one or more aspects of wireless communications systems 200-*a* and/or 200-*b*. For instance, index modulation scheme 400 may represent a scheme for decoding signal 210-*a* as described with reference to FIG. 2A and/or signal 210-*b* as described with reference to FIG. 2B (e.g., the second modulation scheme as described with reference to FIGS. 2A and/or 2B). Although the present example is described in the context of subcarriers, the same techniques may be applied for slots, channel states, and/or antennas as described herein.

In some examples, OFDM subcarriers may carry modulation symbols belonging to one out of G groups, where each group has 1 of s possible distinguishable and/or orthogonal modulation symbols (e.g., each group may have a size of $\log_2(s)$ bits). In some examples, Part 1 bits may be used to determine the group. For instance, the quantity of Part 1 bits may be $p_1=\lceil \log 2(G) \rceil$ bits per subcarrier. The Part 2 bits may be used to determine the modulation symbol (e.g., within a group). For instance, a total quantity of Part 2 bits may be given by $p_2=\lceil \log 2(S) \rceil$ bits per subcarrier. For L subcarriers, a total quantity of bits carried may thus be $m=L\times(p_1+p_2)$.

Index modulation scheme 400 may depict a table showing a mapping between a group and modulation symbols with L=16, S=4, and G=2. In some examples, to determine a Part 1 bit using index modulation scheme 400, a wireless device may determine whether a corresponding set of Part 2 bits is in Group A or Group B. In the present example, a set of Part 2 bits may be in Group A if the corresponding modulation symbol is within the range 0-3 and may be in Group B if the corresponding modulation symbol is within the range 4-7. For instance, the set of Part 2 bits associated with subcarrier index 0 may have a modulation symbol of 4 and may thus be Group B bits. Additionally, the set of Part 2 bits associated with subcarrier index 2 may have a modulation index of 1 and may thus be Group A bits. If a set of Part 2 bits is in Group A, its corresponding Part 1 bit may have a value of 0 and, if the set of Part 2 bits is In Group B, its corresponding Part 1 bit may have a value of 1. Thus, in the present example, the set of Part 2 bits associated with subcarrier index 0 may map to a Part 1 bit with a value of 1 and the set of Part 2 bits associated with subcarrier index 2 may map to a Part 1 bit with a value of 0. The location of a Part 1 bit may be determined by the subcarrier index. For instance, the Part 1 bits may be ordered according to an order of the subcarrier indices (e.g., if subcarrier 0-15 are present, then the Part 1 bits may be aligned with the subcarrier indices to have the form 1100001111000110). The Part 2 bits may be appended to the Part 1 bits and their location may also be determined by the subcarrier index. For instance, the Part 2 bits may have a form 00100110001110110010001010001. The combined form of the Part 1 bits and the Part 2 bits may be 11000011110001100010011000111011001000101010001.

In some examples, index modulation scheme 400 may be used to multiplex information for multiple users and/or multiple channels (e.g., control channels, data channels) using same time and/or frequency resources. For instance, a first wireless device may dedicate the bits 405 for transmitting a message via a first channel and/or for transmitting a message to a first user (e.g., corresponding to a second wireless device). Additionally, the first wireless device may dedicate the bits 410 for transmitting a message via a second channel and/or for transmitting a message to a second user (e.g., corresponding to a third wireless device). The first wireless device may encode the bits 405 (e.g., associated with a first message) and bits 410 (e.g., associated with a second message) into a signal and may transmit the signal. In some examples, a second wireless device may receive the signal and may decode the bits 405 for a first channel (e.g., one of a control channel or a data channel) and the bits 410 for a second channel (e.g., the other of the control channel or the data channel). In other examples, the second wireless device may receive the signal and may decode one of the bits 405 or the bits 410 (e.g., in examples in which the other of the bits 405 or the bits 410 is dedicated to another user). In some such examples, a third wireless device may receive the signal and may decode the other of the bits 405 or the bits 410. In some such examples, the third wireless device may refrain from decoding the one of the bits 405 or the bits 410 decoded by the second wireless device (e.g., as the one of the bits 405 or the Part 2 bits may be dedicated to the second wireless device). In some examples, the second wireless device may decode the one of the bits 405 or the bits 410 for the first channel and the third wireless device may decode the other of the bits 405 or the bits 410 for the second channel. Whichever wireless device that decodes the bits 405 may decode $X(\lceil \log 2(G) \rceil + m \log_2(S))$ information bits (e.g., 16 information bits in the present example) and whichever wireless device that decodes the bits 410 may decode L×(m−1)log 2(S) information bits (e.g., 32 information bits in the present example, where m is a total quantity of subcarriers whose associated bits are in Group B).

In some examples (e.g., for index modulation schemes 300 and/or 400), MM-OFDM-IM with sub-block partitions may be performed. For instance, L sub-carriers may be partitioned into B sub-blocks with length $L_{SB}$ for each sub-block. G orthogonal groups may be within each sub-block and Part 1 bits may be used to determine the group in the sub-block, where $k_j$ may be a quantity of subcarriers in group j and where the quantity of bits $p_1$ in the Part 1 bits may be equal to $$\left\lfloor \log_2 \prod_{b=0}^{B} \left( \frac{L_{SB} - \sum_{j=0}^{b-1} k_j}{k_b} \right) \right\rfloor \text{ bits}$$

per sub-block. The part 2 bits may be used to determine the modulation symbol within the group and may have a total quantity of bits $p_2 = \sum_{i=0}^{G-1} k_i \log_2(s_i)$ bits per sub-block. For B sub-blocks, the total quantity of bits carried $m=B(p_1+p_2)$. In a first example, a first sub-block of the B sub-blocks may have the sets of bits from subcarrier index 0 through 3. The Part 2 bits for subcarrier index 0 may have a bit value of 00 and a modulation symbol of 4; the Part 2 bits for subcarrier index 1 may have a bit value of 10 and a modulation symbol of 6; the Part 2 bits for subcarrier index 2 may have a bit value of 01 and a modulation symbol of 1; and the Part 2 bits for subcarrier index 3 may have a bit value of 10 and a modulation symbol of 2. In the present example, if bits in Group A have a modulation symbol of 0-3 and bits in Group B have a modulation symbol of 4-7, then the Part 2 bits associated with subcarrier indices 0 and 1 may be Group B bits and the Part 2 bits associated with subcarrier indices 2 and 3 may be Group A bits. As the first two subcarrier indices for the sub-block have Group B bits and the second two subcarrier indices for the sub-block have Group A bits, the corresponding Part 1 bits may be 10. The total bits for the sub-block may then have the form of the Part 1 bits followed by the Part 2 bits in order of subcarrier index. For instance, in the present example, the total bits conveyed may be 1000100110. A similar procedure may be performed for each other sub-block partition and the total bits from each sub-block may be appended together sequentially (e.g., starting a first sub-block in an order and going onwards). The techniques described herein may also be performed on Part 1 bits and Part 2 bits of this form.

Figure 5:
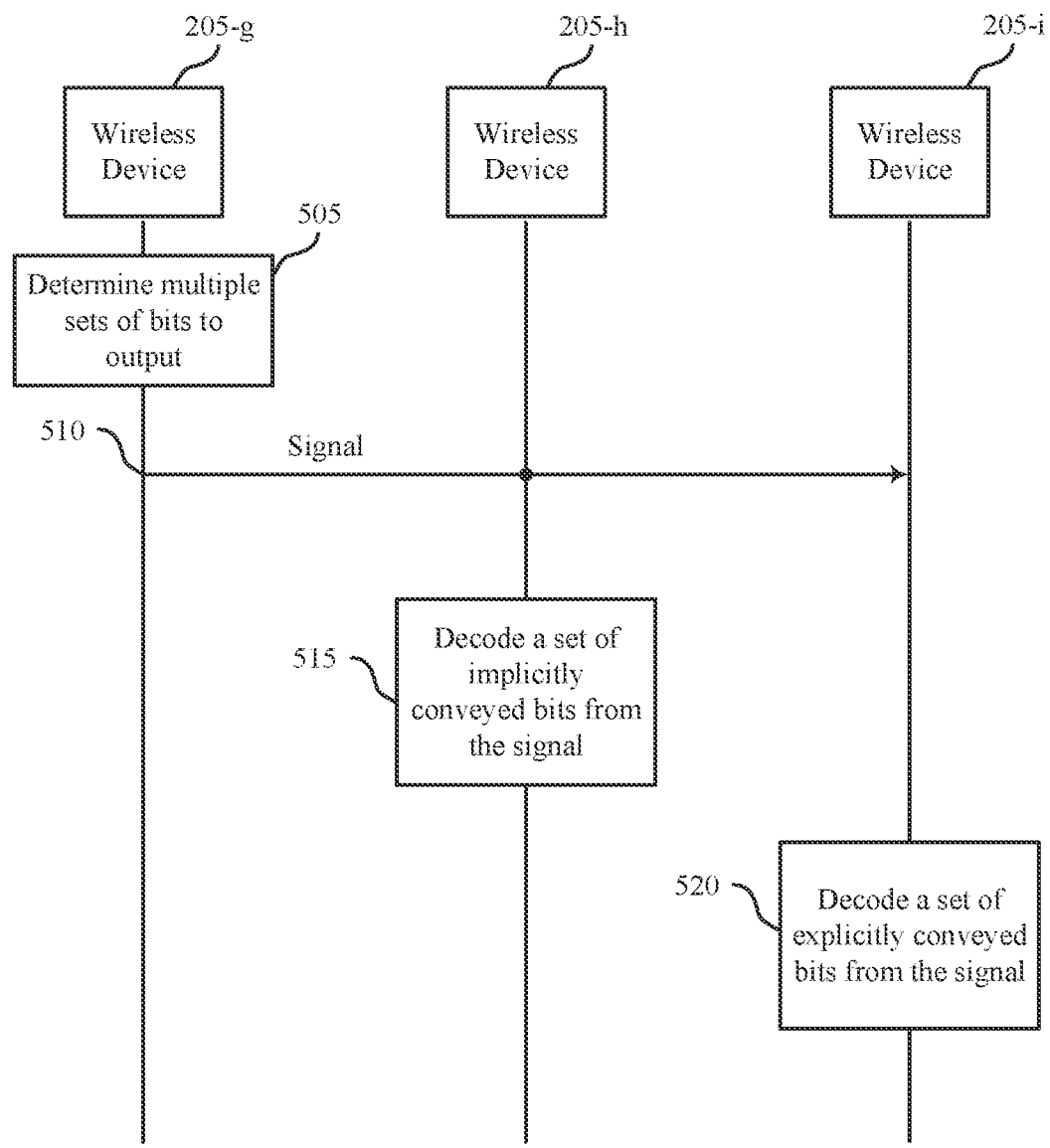
FIG. 5 illustrates an example of a process flow that supports multiplexing techniques using OFDM index modulation in accordance with one or more aspects of the present disclosure.

FIG. 5 illustrates an example of a process flow 500 that supports multiplexing techniques using OFDM index modulation in accordance with one or more aspects of the present disclosure. In some examples, process flow 500 may be implemented by one or more aspects of wireless communications systems 100, 200-a, and/or 200-b. For instance, wireless device 205-g may be an example of a UE 115 or a network entity 105 as described with reference to FIG. 1 and/or a first wireless device 205-a as described with reference to FIG. 2A. Additionally, or alternatively, wireless devices 205-h and 205-i may each be an example of a UE 115 or network entity 105 as described with reference to FIG. 1 and/or second wireless device 205-b or third wireless device 205-c as described with reference to FIG. 2A.

At 505, wireless device 205-g may determine multiple sets of bits to output via a signal. Each set of bits of the multiple sets of bits may be associated with a first group or a second group based on a respective modulation index for each set of bits. In some examples, each set of bits of the multiple sets of bits maps to one or more additional bits based on an association of each set of bits of the multiple sets of bits with the first group, the second group, or both.

At 510, wireless device 205-g may output the signal including a first message, a second message, or both, where the first message is formed at least partially by the one or more additional bits, and where the second message is formed at least partially by respective sets of bits of the multiple sets of bits associated with the second group. In some examples, the first message may be associated with a first channel, a second wireless device (e.g., wireless device 205-h), or both. In some examples, the second message may be associated with a second channel, a third wireless device (e.g., wireless device 205-i), or both. In some examples, the second message may be formed by respective sets of bits of the multiple sets of bits associated with the first group and the respective sets of bits associated with the second group. In other examples, the first message may be formed by respective sets of bits of the multiple sets of bits associated with the first group and the one or more additional bits. In some examples, each set of bits of the multiple sets of bits is output over a distinct subcarrier, a distinct slot, a distinct spatial stream (e.g., antenna), a distinct channel state, or any combination thereof. In some examples, an ordering of the one or more additional bits is based on an index for the distinct subcarrier, the distinct slot, the distinct spatial stream, the distinct channel state, or the any combination thereof over which each set of bits of the multiple sets of bits is output. In some examples, the first group is associated with a first set of constellation values and the second group is associated with a second set of constellation values. In some such examples, the first set of constellation values may be orthogonal to the second set of constellation values.

At 515, wireless device 205-*h* may receive the signal and may decode the first message. In some examples, wireless device 205-*h* may refrain from decoding the second message (e.g., as the second message may be for wireless device 205-*i*).

At 520, wireless device 205-*i* may receive the signal and may decode the second message. In some examples, wireless device 205-*i* may refrain from decoding the first message (e.g., as the first message may be for wireless device 205-*h*).

In some examples, wireless device 205-*h* may output control signaling indicating a parameter, where the parameter indicates to form the first message at least partially by respective sets of bits of the multiple sets of bits associated with the first group when the parameter has a first value. Additionally, or alternatively, the parameter may indicate to form the second message at least partially by respective sets of bits of the multiple sets of bits associated with the first group when the parameter has a second value distinct from the first value. One or both of wireless devices 205-*h* or 205-*i* may receive the control signaling indicating the parameter.

Figure 6:
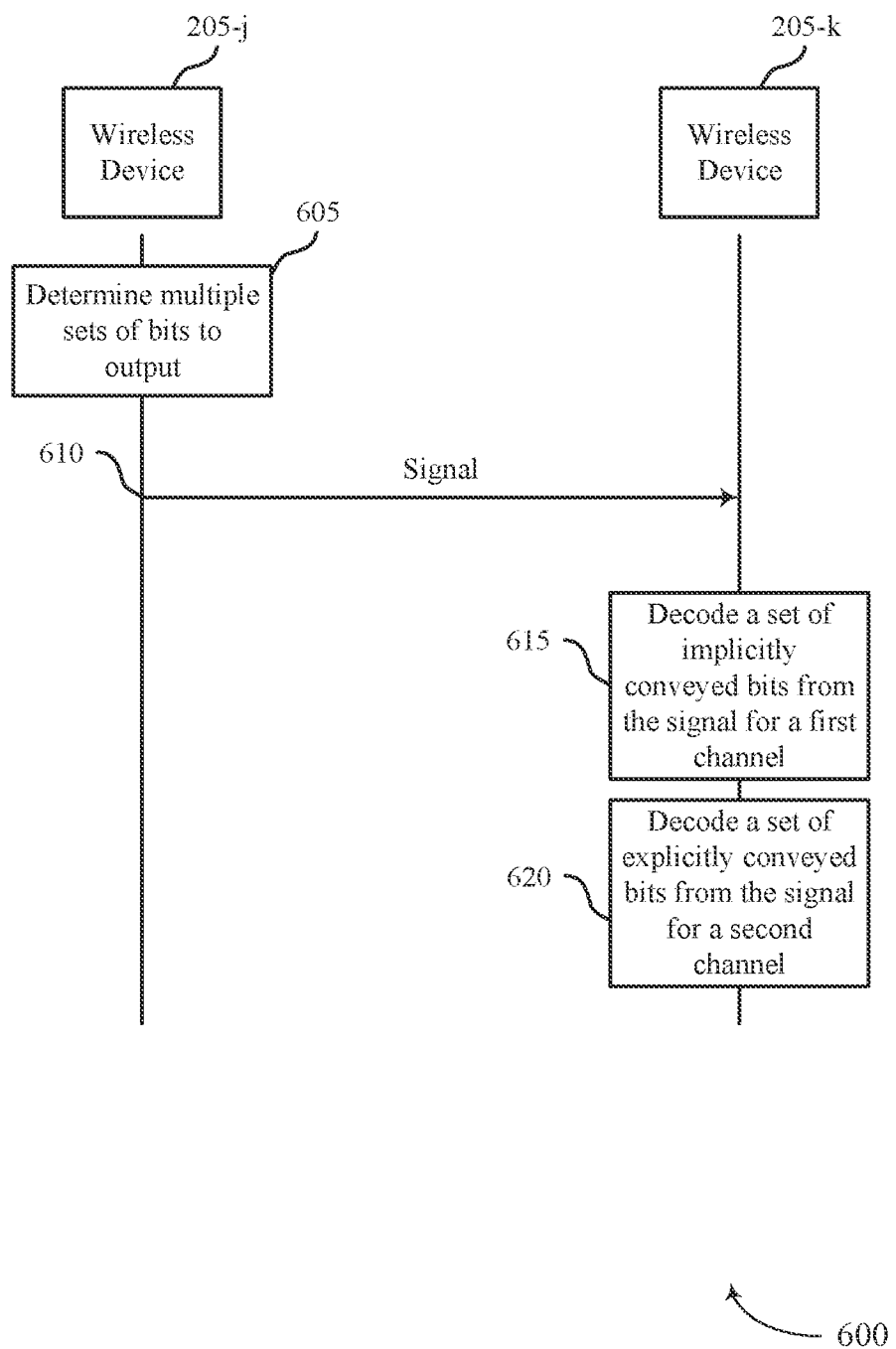
FIG. 6 illustrates an example of a process flow that supports multiplexing techniques using OFDM index modulation in accordance with one or more aspects of the present disclosure.

FIG. 6 illustrates an example of a process flow 600 that supports multiplexing techniques using OFDM index modulation in accordance with one or more aspects of the present disclosure. In some examples, process flow 600 may be implemented by one or more aspects of wireless communications systems 100, 200-*a*, and/or 200-*b*. For instance, wireless device 205-*j* may be an example of a UE 115 or a network entity 105 as described with reference to FIG. 1 and/or a first wireless device 205-*d* as described with reference to FIG. 2B. Additionally, or alternatively, wireless device 205-*k* may be an example of a UE 115 or a network entity 105 as described with reference to FIG. 1 and/or second wireless device 205-*e* as described with reference to FIG. 2B.

At 605, wireless device 205-*j* may determine multiple sets of bits to output via a signal. Each set of bits of the multiple sets of bits may be associated with a first group or a second group based on a respective modulation index for each set of bits. In some examples, each set of bits of the multiple sets of bits maps to one or more additional bits based on an association of each set of bits of the multiple sets of bits with the first group, the second group, or both.

At 610, wireless device 205-*j* may output the signal including a first message, a second message, or both, where the first message is formed at least partially by the one or more additional bits, and where the second message is formed at least partially by respective sets of bits of the multiple sets of bits associated with the second group. In some examples, the first message may be associated with a first channel, a second wireless device, or both. In some examples, the second message may be associated with a second channel, a third wireless device, or both. In some examples, the second message may be formed by respective sets of bits of the multiple sets of bits associated with the first group and the respective sets of bits associated with the second group. In other examples, the first message may be formed by respective sets of bits of the multiple sets of bits associated with the first group and the one or more additional bits. In some examples, each set of bits of the multiple sets of bits is output over a distinct subcarrier, a distinct slot, a distinct spatial stream (e.g., antenna), a distinct channel state, or any combination thereof. In some examples, the first group is associated with a first set of constellation values and the second group is associated with a second set of constellation values. In some such examples, the first set of constellation values may be orthogonal to the second set of constellation values. Wireless device 205-*k* may receive the signal.

At 615, wireless device 205-*k* may decode the first message for the first channel (e.g., one of a data channel or a control channel). At 620, wireless device 205-*k* may decode the second message for the second channel (e.g., the other of the data channel or the control channel).

In some examples, wireless device 205-*j* may output control signaling indicating a parameter, where the parameter indicates to form the first message at least partially by respective sets of bits of the multiple sets of bits associated with the first group when the parameter has a first value. Additionally, or alternatively, the parameter may indicate to form the second message at least partially by respective sets of bits of the multiple sets of bits associated with the first group when the parameter has a second value distinct from the first value. Wireless device 205-*k* may receive the control signaling indicating the parameter.

Figure 7:
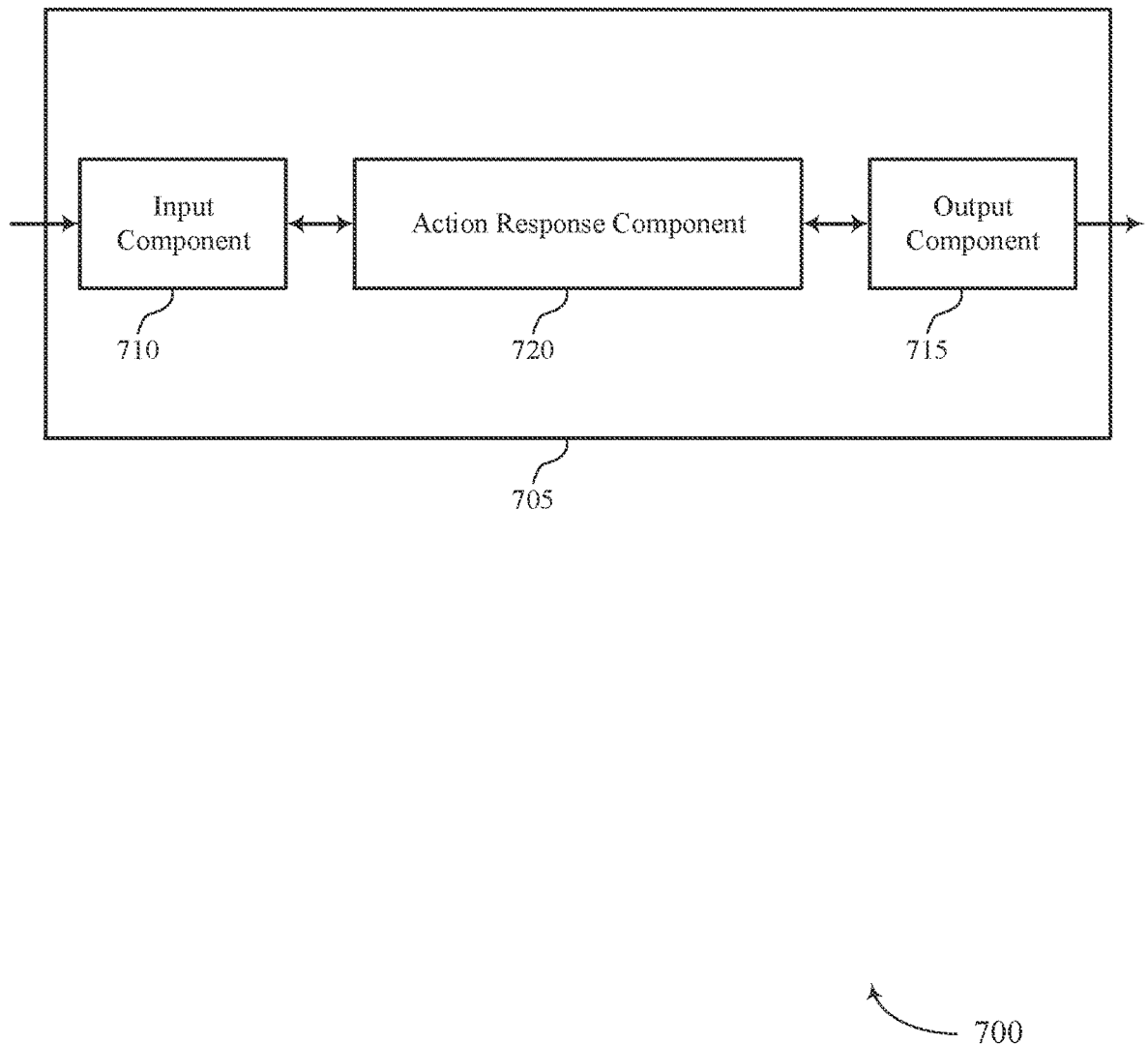
FIGS. 7 and 8 illustrate block diagrams of devices that support multiplexing techniques using OFDM index modulation in accordance with one or more aspects of the present disclosure.

FIG. 7 illustrates a block diagram 700 of a device 705 that supports multiplexing techniques using OFDM index modulation in accordance with one or more aspects of the present disclosure. The device 705 may be an example of aspects of a wireless device as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to multiplexing techniques using OFDM index modulation).

Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to multiplexing techniques using OFDM index modulation). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of multiplexing techniques using OFDM index modulation as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 720 may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communication at a first wireless device in accordance with examples as disclosed herein. For example, the communications manager 720 may be configured as or otherwise support a means for receiving a signal including multiple sets of bits, where each set of bits of the multiple sets of bits is associated with either a first group or a second group based on a respective modulation index for each set of bits, and where each set of bits of the multiple sets of bits maps to one or more additional bits based on an association of each set of bits with the first group, the second group, or both. The communications manager 720 may be configured as or otherwise support a means for decoding both a first message and a second message, where the first message is associated with a first channel and formed at least partially by the one or more additional bits, and where the second message is associated with a second channel different from the first channel and formed at least partially by respective sets of bits of the multiple sets of bits associated with the second group.

Additionally, or alternatively, the communications manager 720 may support wireless communication at a first wireless device in accordance with examples as disclosed herein. For example, the communications manager 720 may be configured as or otherwise support a means for receiving a signal including multiple sets of bits, where each set of bits of the multiple sets of bits is associated with either a first group or a second group based on a respective modulation index for each set of bits, and where each set of bits of the multiple sets of bits maps to one or more additional bits based on an association of each set of bits with the first group, the second group, or both. The communications manager 720 may be configured as or otherwise support a means for decoding either a first message or a second message, where the first message is formed at least partially by the one or more additional bits, where the second message is formed at least partially by respective sets of bits of the multiple sets of bits associated with the second group, and where the first message is for one of the first wireless device or a second wireless device and the second message is for the other of the first wireless device or the second wireless device.

Additionally, or alternatively, the communications manager 720 may support wireless communication at a first wireless device in accordance with examples as disclosed herein. For example, the communications manager 720 may be configured as or otherwise support a means for determining multiple sets of bits to output via a signal, where each set of bits of the multiple sets of bits is associated with a first group or a second group based on a respective modulation index for each set of bits, and where each set of bits of the multiple sets of bits maps to one or more additional bits based on an association of each set of bits of the multiple sets of bits with the first group, the second group, or both. The communications manager 720 may be configured as or otherwise support a means for outputting the signal including a first message, or a second message, or both, where the first message is formed at least partially by the one or more additional bits, where the second message is formed at least partially by respective sets of bits of the multiple sets of bits associated with the second group, where the first message is associated with a first channel, a second wireless device, or both, and where the second message is associated with a second channel, a third wireless device, or both.

By including or configuring the communications manager 720 in accordance with examples as described herein, the device 705 (e.g., a processor controlling or otherwise coupled with the receiver 710, the transmitter 715, the communications manager 720, or a combination thereof) may support techniques for a single index-modulated transmission to convey multiple messages for different channels and/or different wireless devices.

Figure 8:
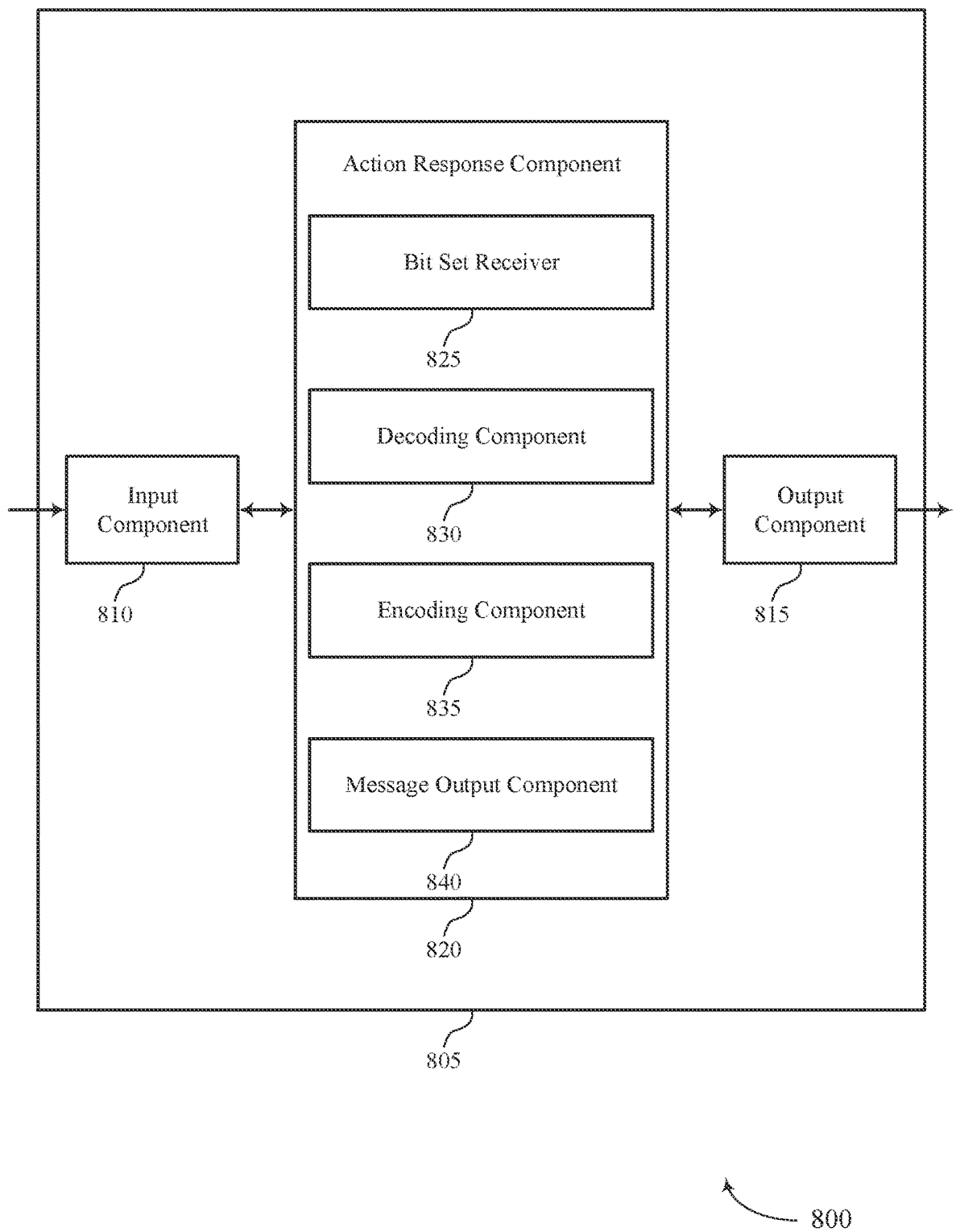

FIG. 8 illustrates a block diagram 800 of a device 805 that supports multiplexing techniques using OFDM index modulation in accordance with one or more aspects of the present disclosure. The device 805 may be an example of aspects of a device 705 or a wireless device 205 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to multiplexing techniques using OFDM index modulation). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to multiplexing techniques using OFDM index modulation). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of multiplexing techniques using OFDM index modulation as described herein. For example, the communications manager 820 may include a bit set receiver 825, a decoding component 830, an encoding component 835, a message output component 840, or any combination thereof. The communications manager 820 may be an example of aspects of a communications manager 720 as described herein. In some examples, the communications manager 820, or various components thereof, may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communication at a first wireless device in accordance with examples as disclosed herein. The bit set receiver 825 may be configured as or otherwise support a means for receiving a signal including multiple sets of bits, where each set of bits of the multiple sets of bits is associated with either a first group or a second group based on a respective modulation index for each set of bits, and where each set of bits of the multiple sets of bits maps to one or more additional bits based on an association of each set of bits with the first group, the second group, or both. The decoding component 830 may be configured as or otherwise support a means for decoding both a first message and a second message, where the first message is associated with a first channel and formed at least partially by the one or more additional bits, and where the second message is associated with a second channel different from the first channel and formed at least partially by respective sets of bits of the multiple sets of bits associated with the second group.

Additionally, or alternatively, the communications manager 820 may support wireless communication at a first wireless device in accordance with examples as disclosed herein. The bit set receiver 825 may be configured as or otherwise support a means for receiving a signal including multiple sets of bits, where each set of bits of the multiple sets of bits is associated with either a first group or a second group based on a respective modulation index for each set of bits, and where each set of bits of the multiple sets of bits maps to one or more additional bits based on an association of each set of bits with the first group, the second group, or both. The decoding component 830 may be configured as or otherwise support a means for decoding either a first message or a second message, where the first message is formed at least partially by the one or more additional bits, where the second message is formed at least partially by respective sets of bits of the multiple sets of bits associated with the second group, and where the first message is for one of the first wireless device or a second wireless device and the second message is for the other of the first wireless device or the second wireless device.

Additionally, or alternatively, the communications manager 820 may support wireless communication at a first wireless device in accordance with examples as disclosed herein. The encoding component 835 may be configured as or otherwise support a means for determining multiple sets of bits to output via a signal, where each set of bits of the multiple sets of bits is associated with a first group or a second group based on a respective modulation index for each set of bits, and where each set of bits of the multiple sets of bits maps to one or more additional bits based on an association of each set of bits of the multiple sets of bits with the first group, the second group, or both. The message output component 840 may be configured as or otherwise support a means for outputting the signal including a first message, or a second message, or both, where the first message is formed at least partially by the one or more additional bits, where the second message is formed at least partially by respective sets of bits of the multiple sets of bits associated with the second group, where the first message is associated with a first channel, a second wireless device, or both, and where the second message is associated with a second channel, a third wireless device, or both.

Figure 9:
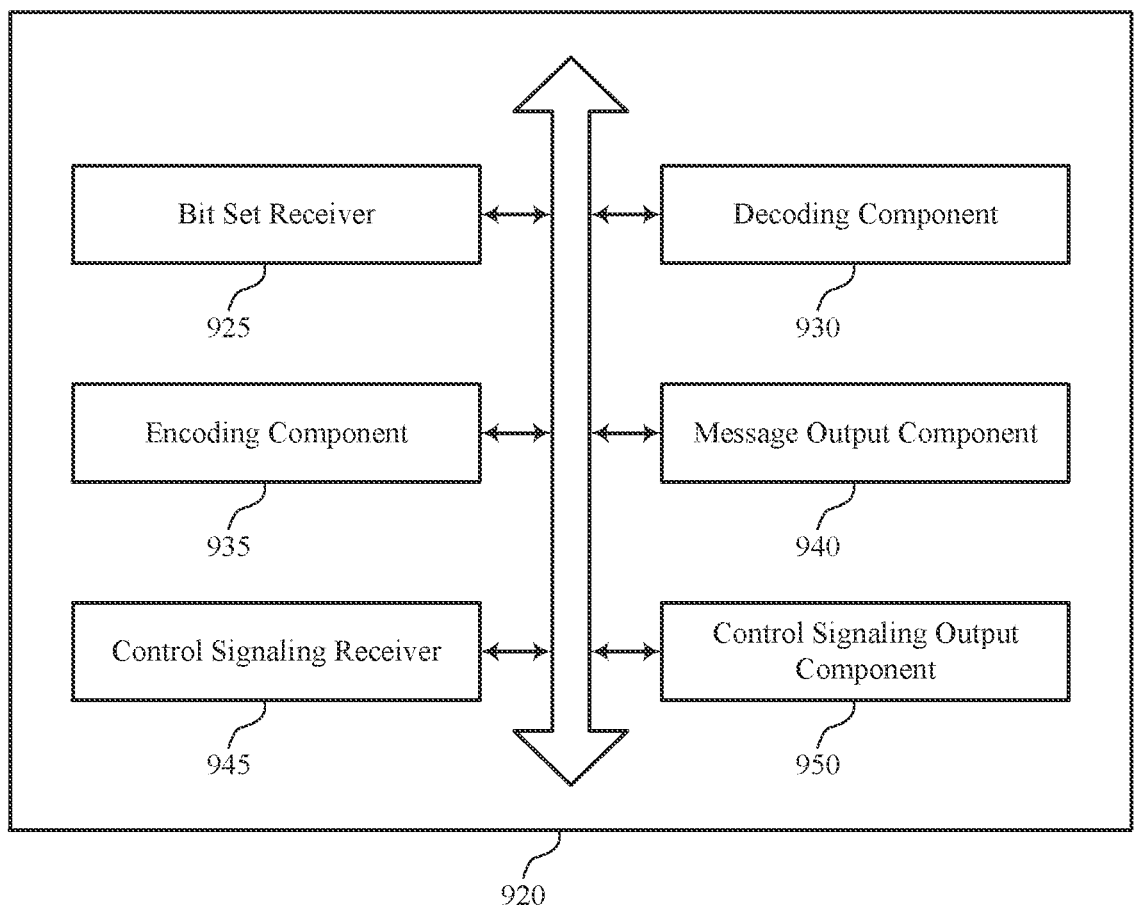
FIG. 9 illustrates a block diagram of an action response component that supports multiplexing techniques using OFDM index modulation in accordance with one or more aspects of the present disclosure.

FIG. 9 illustrates a block diagram 900 of a communications manager 920 that supports multiplexing techniques using OFDM index modulation in accordance with one or more aspects of the present disclosure. The communications manager 920 may be an example of aspects of a communications manager 720, a communications manager 820, or both, as described herein. The communications manager 920, or various components thereof, may be an example of means for performing various aspects of multiplexing techniques using OFDM index modulation as described herein. For example, the communications manager 920 may include a bit set receiver 925, a decoding component 930, an encoding component 935, a message output component 940, a control signaling receiver 945, a control signaling output component 950, or any combination thereof. Each of these components may communicate, directly or indirectly, with one another (e.g., via one or more buses).

The communications manager 920 may support wireless communication at a first wireless device in accordance with examples as disclosed herein. The bit set receiver 925 may be configured as or otherwise support a means for receiving a signal including multiple sets of bits, where each set of bits of the multiple sets of bits is associated with either a first group or a second group based on a respective modulation index for each set of bits, and where each set of bits of the multiple sets of bits maps to one or more additional bits based on an association of each set of bits with the first group, the second group, or both. The decoding component 930 may be configured as or otherwise support a means for decoding both a first message and a second message, where the first message is associated with a first channel and formed at least partially by the one or more additional bits, and where the second message is associated with a second channel different from the first channel and formed at least partially by respective sets of bits of the multiple sets of bits associated with the second group.

In some examples, the second message is formed by respective sets of bits of the multiple sets of bits associated with the first group and the respective sets of bits associated with the second group.

In some examples, the first message is formed by respective sets of bits of the multiple sets of bits associated with the first group and the one or more additional bits.

In some examples, the control signaling receiver 945 may be configured as or otherwise support a means for receiving control signaling indicating a parameter, where the parameter indicates to form the first message at least partially by respective sets of bits of the multiple sets of bits associated with the first group when the parameter has a first value, and where the parameter indicates to form the second message at least partially by respective sets of bits of the multiple sets of bits associated with the first group when the parameter has a second value distinct from the first value.

In some examples, each set of bits of the multiple sets of bits is received over a distinct subcarrier, a distinct slot, a distinct spatial stream, a distinct channel state, or any combination thereof.

In some examples, an ordering of the one or more additional bits is based on an index for the distinct subcarrier, the distinct slot, the distinct spatial stream, the distinct channel state, or the any combination thereof over which each set of bits of the multiple sets of bits is output.

In some examples, the first group is associated with a first set of constellation values and. In some examples, the second group is associated with a second set of constellation values, the first set of constellation values being orthogonal to the second set of constellation values.

In some examples, the first channel includes one of a data channel or a control channel. In some examples, the second channel includes the other of the data channel or the control channel.

Additionally, or alternatively, the communications manager 920 may support wireless communication at a first wireless device in accordance with examples as disclosed herein. In some examples, the bit set receiver 925 may be configured as or otherwise support a means for receiving a signal including multiple sets of bits, where each set of bits of the multiple sets of bits is associated with either a first group or a second group based on a respective modulation index for each set of bits, and where each set of bits of the multiple sets of bits maps to one or more additional bits based on an association of each set of bits with the first group, the second group, or both. In some examples, the decoding component 930 may be configured as or otherwise support a means for decoding either a first message or a second message, where the first message is formed at least partially by the one or more additional bits, where the second message is formed at least partially by respective sets of bits of the multiple sets of bits associated with the second group, and where the first message is for one of the first wireless device or a second wireless device and the second message is for the other of the first wireless device or the second wireless device.

In some examples, the second message is formed by respective sets of bits of the multiple sets of bits associated with the first group and the respective sets of bits associated with the second group.

In some examples, the first message is formed by respective sets of bits of the multiple sets of bits associated with the first group and the one or more additional bits.

In some examples, the control signaling receiver 945 may be configured as or otherwise support a means for receiving control signaling indicating a parameter, where the parameter indicates to form the first message at least partially by respective sets of bits of the multiple sets of bits associated with the first group when the parameter has a first value, and where the parameter indicates to form the second message at least partially by respective sets of bits of the multiple sets of bits associated with the first group when the parameter has a second value distinct from the first value.

In some examples, each set of bits of the multiple sets of bits is received over a distinct subcarrier, a distinct slot, a distinct spatial stream, a distinct channel state, or any combination thereof.

In some examples, the first group is associated with a first set of constellation values and. In some examples, the second group is associated with a second set of constellation values, the first set of constellation values being orthogonal to the second set of constellation values.

Additionally, or alternatively, the communications manager 920 may support wireless communication at a first wireless device in accordance with examples as disclosed herein. The encoding component 935 may be configured as or otherwise support a means for determining multiple sets of bits to output via a signal, where each set of bits of the multiple sets of bits is associated with a first group or a second group based on a respective modulation index for each set of bits, and where each set of bits of the multiple sets of bits maps to one or more additional bits based on an association of each set of bits of the multiple sets of bits with the first group, the second group, or both. The message output component 940 may be configured as or otherwise support a means for outputting the signal including a first message, or a second message, or both, where the first message is formed at least partially by the one or more additional bits, where the second message is formed at least partially by respective sets of bits of the multiple sets of bits associated with the second group, where the first message is associated with a first channel, a second wireless device, or both, and where the second message is associated with a second channel, a third wireless device, or both.

In some examples, the second message is formed by respective sets of bits of the multiple sets of bits associated with the first group and the respective sets of bits associated with the second group.

In some examples, the first message is formed by respective sets of bits of the multiple sets of bits associated with the first group and the one or more additional bits.

In some examples, the control signaling output component 950 may be configured as or otherwise support a means for outputting control signaling indicating a parameter, where the parameter indicates to form the first message at least partially by respective sets of bits of the multiple sets of bits associated with the first group when the parameter has a first value, and where the parameter indicates to form the second message at least partially by respective sets of bits of the multiple sets of bits associated with the first group when the parameter has a second value distinct from the first value.

In some examples, each set of bits of the multiple sets of bits is output over a distinct subcarrier, a distinct slot, a distinct spatial stream, a distinct channel state, or any combination thereof.

In some examples, the first group is associated with a first set of constellation values and. In some examples, the second group is associated with a second set of constellation values, the first set of constellation values being orthogonal to the second set of constellation values.

In some examples, the first channel includes one of a data channel or a control channel. In some examples, the second channel includes the other of the data channel or the control channel.

Figure 10:
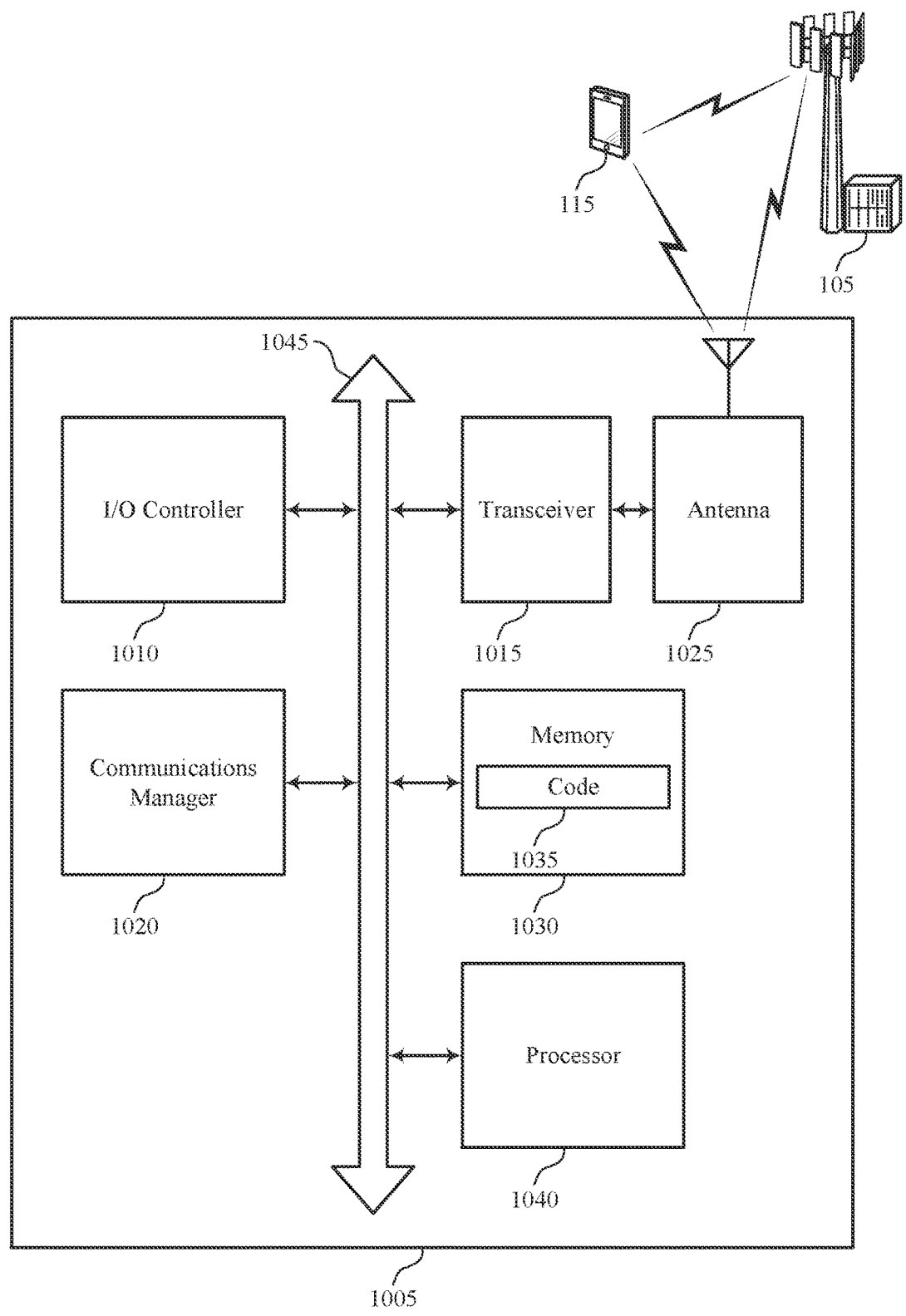
FIG. 10 illustrates a diagram of a system including a device that supports multiplexing techniques using OFDM index modulation in accordance with one or more aspects of the present disclosure.

FIG. 10 illustrates a diagram of a system 1000 including a device 1005 that supports multiplexing techniques using OFDM index modulation in accordance with one or more aspects of the present disclosure. The device 1005 may be an example of or include the components of a device 705, a device 805, or a wireless device as described herein. The device 1005 may include components for bi-directional voice and data communications including components for transmitting and receiving communications, such as a communications manager 1020, an I/O controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally, or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include RAM and ROM. The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a BIOS which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting multiplexing techniques using OFDM index modulation). For example, the device 1005 or a component of the device 1005 may include a processor 1040 and memory 1030 coupled with or to the processor 1040, the processor 1040 and memory 1030 configured to perform various functions described herein.

The communications manager 1020 may support wireless communication at a first wireless device in accordance with examples as disclosed herein. For example, the communications manager 1020 may be configured as or otherwise support a means for receiving a signal including multiple sets of bits, where each set of bits of the multiple sets of bits is associated with either a first group or a second group based on a respective modulation index for each set of bits, and where each set of bits of the multiple sets of bits maps to one or more additional bits based on an association of each set of bits with the first group, the second group, or both. The communications manager 1020 may be configured as or otherwise support a means for decoding both a first message and a second message, where the first message is associated with a first channel and formed at least partially by the one or more additional bits, and where the second message is associated with a second channel different from the first channel and formed at least partially by respective sets of bits of the multiple sets of bits associated with the second group.

Additionally, or alternatively, the communications manager 1020 may support wireless communication at a first wireless device in accordance with examples as disclosed herein. For example, the communications manager 1020 may be configured as or otherwise support a means for receiving a signal including multiple sets of bits, where each set of bits of the multiple sets of bits is associated with either a first group or a second group based on a respective modulation index for each set of bits, and where each set of bits of the multiple sets of bits maps to one or more additional bits based on an association of each set of bits with the first group, the second group, or both. The communications manager 1020 may be configured as or otherwise support a means for decoding either a first message or a second message, where the first message is formed at least partially by the one or more additional bits, where the second message is formed at least partially by respective sets of bits of the multiple sets of bits associated with the second group, and where the first message is for one of the first wireless device or a second wireless device and the second message is for the other of the first wireless device or the second wireless device.

Additionally, or alternatively, the communications manager 1020 may support wireless communication at a first wireless device in accordance with examples as disclosed herein. For example, the communications manager 1020 may be configured as or otherwise support a means for determining multiple sets of bits to output via a signal, where each set of bits of the multiple sets of bits is associated with a first group or a second group based on a respective modulation index for each set of bits, and where each set of bits of the multiple sets of bits maps to one or more additional bits based on an association of each set of bits of the multiple sets of bits with the first group, the second group, or both. The communications manager 1020 may be configured as or otherwise support a means for outputting the signal including a first message, or a second message, or both, where the first message is formed at least partially by the one or more additional bits, where the second message is formed at least partially by respective sets of bits of the multiple sets of bits associated with the second group, where the first message is associated with a first channel, a second wireless device, or both, and where the second message is associated with a second channel, a third wireless device, or both.

By including or configuring the communications manager 1020 in accordance with examples as described herein, the device 1005 may support techniques for a single index-modulated transmission to convey multiple messages for different channels and/or different wireless devices.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of multiplexing techniques using OFDM index modulation as described herein, or the processor 1040 and the memory 1030 may be otherwise configured to perform or support such operations.

Figure 11:
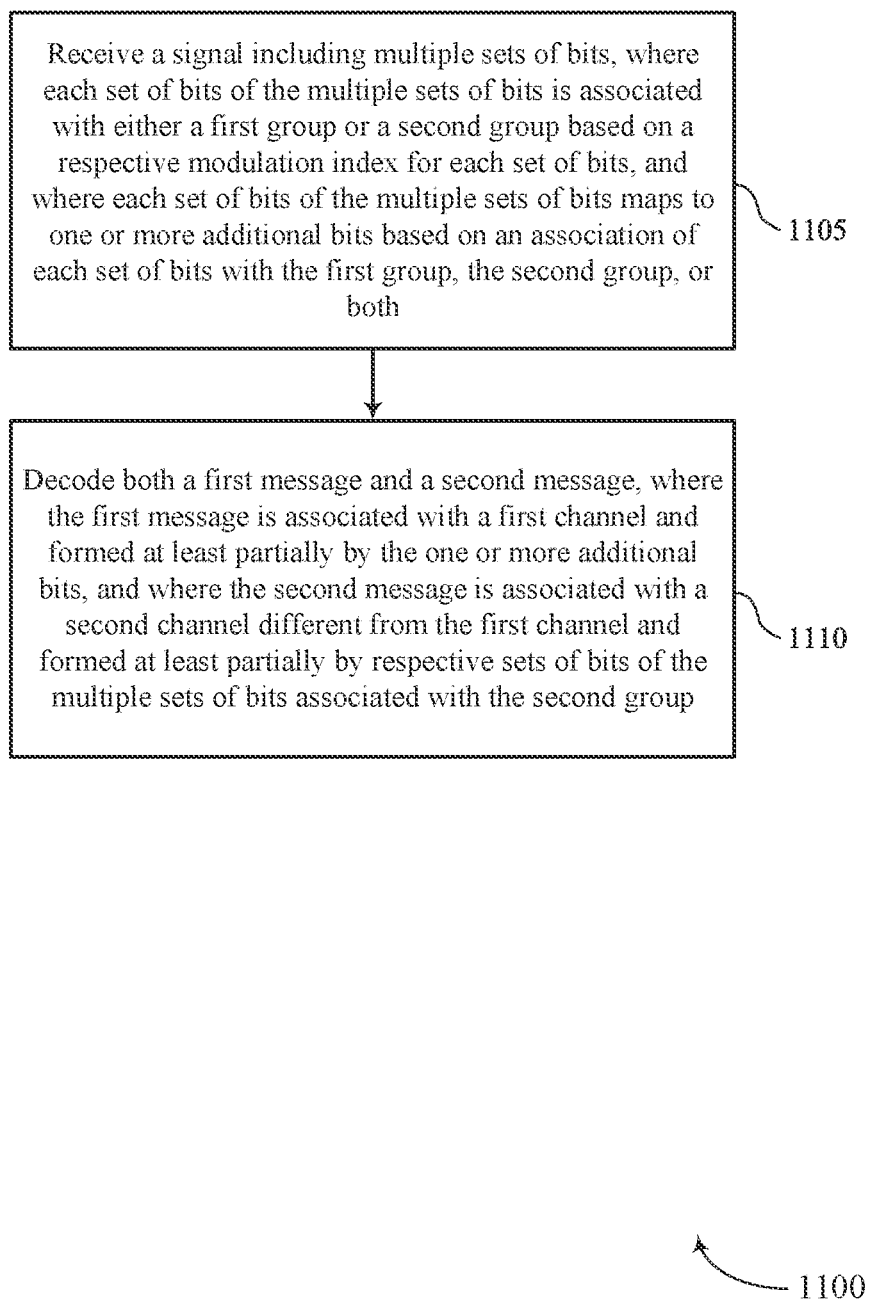
FIGS. 11 through 13 illustrate flowcharts showing methods that support multiplexing techniques using OFDM index modulation in accordance with one or more aspects of the present disclosure.

FIG. 11 illustrates a flowchart showing a method 1100 that supports multiplexing techniques using OFDM index modulation in accordance with one or more aspects of the present disclosure. The operations of the method 1100 may be implemented by a wireless device or its components as described herein. For example, the operations of the method 1100 may be performed by a wireless device as described with reference to FIGS. 1 through 10. In some examples, a wireless device may execute a set of instructions to control the functional elements of the wireless device to perform the described functions. Additionally, or alternatively, the wireless device may perform aspects of the described functions using special-purpose hardware.

At 1105, the method may include receiving a signal including multiple sets of bits, where each set of bits of the multiple sets of bits is associated with either a first group or a second group based on a respective modulation index for each set of bits, and where each set of bits of the multiple sets of bits maps to one or more additional bits based on an association of each set of bits with the first group, the second group, or both. The operations of 1105 may be performed in accordance with examples as disclosed herein. In some examples, aspects of the operations of 1105 may be performed by a bit set receiver 925 as described with reference to FIG. 9.

At 1110, the method may include decoding both a first message and a second message, where the first message is associated with a first channel and formed at least partially by the one or more additional bits, and where the second message is associated with a second channel different from the first channel and formed at least partially by respective sets of bits of the multiple sets of bits associated with the second group. The operations of 1110 may be performed in accordance with examples as disclosed herein. In some examples, aspects of the operations of 1110 may be performed by a decoding component 930 as described with reference to FIG. 9.

Figure 12:
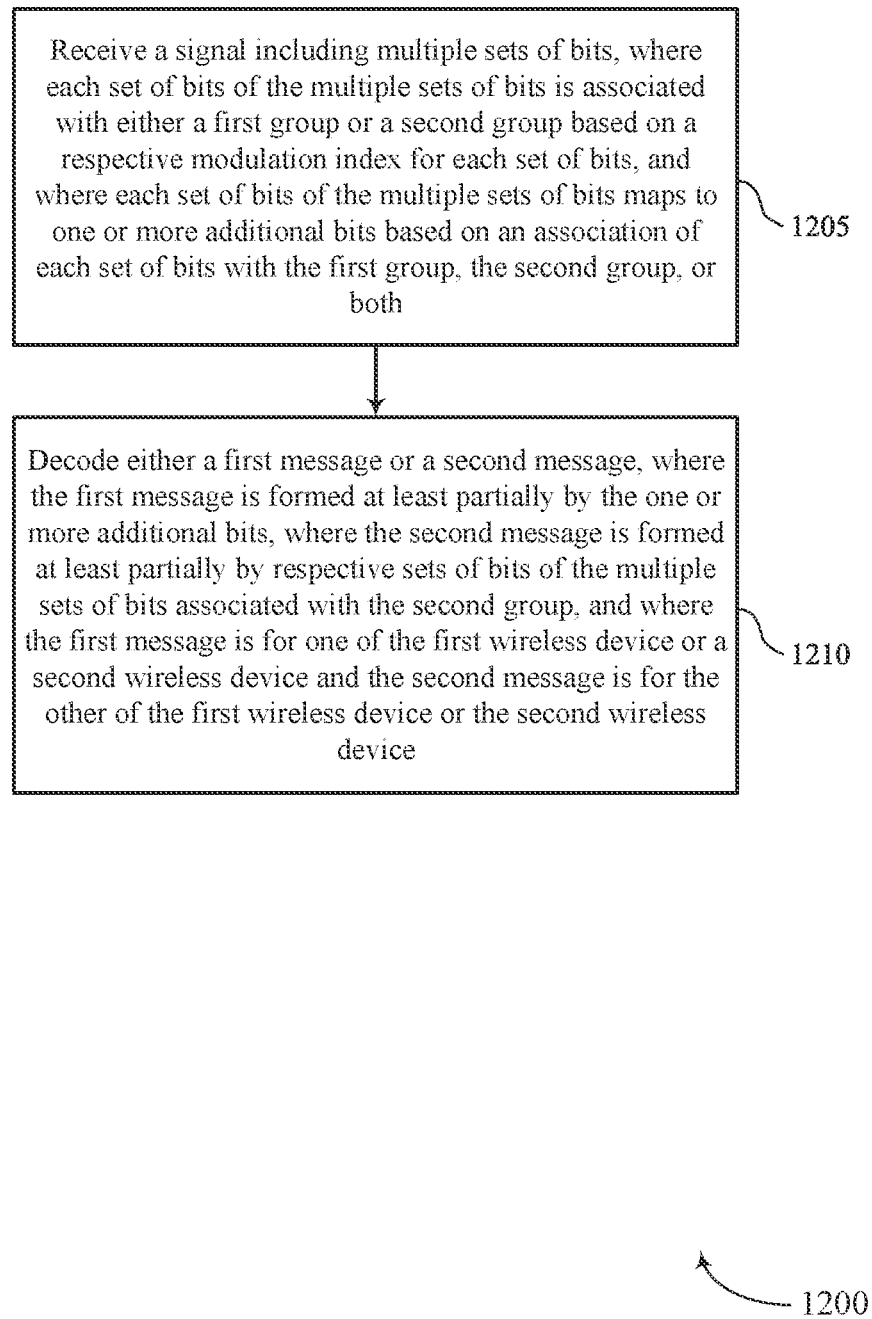

FIG. 12 illustrates a flowchart showing a method 1200 that supports multiplexing techniques using OFDM index modulation in accordance with one or more aspects of the present disclosure. The operations of the method 1200 may be implemented by a wireless device or its components as described herein. For example, the operations of the method 1200 may be performed by a wireless device as described with reference to FIGS. 1 through 10. In some examples, a wireless device may execute a set of instructions to control the functional elements of the wireless device to perform the described functions. Additionally, or alternatively, the wireless device may perform aspects of the described functions using special-purpose hardware.

At 1205, the method may include receiving a signal including multiple sets of bits, where each set of bits of the multiple sets of bits is associated with either a first group or a second group based on a respective modulation index for each set of bits, and where each set of bits of the multiple sets of bits maps to one or more additional bits based on an association of each set of bits with the first group, the second group, or both. The operations of 1205 may be performed in accordance with examples as disclosed herein. In some examples, aspects of the operations of 1205 may be performed by a bit set receiver 925 as described with reference to FIG. 9.

At 1210, the method may include decoding either a first message or a second message, where the first message is formed at least partially by the one or more additional bits, where the second message is formed at least partially by respective sets of bits of the multiple sets of bits associated with the second group, and where the first message is for one of the first wireless device or a second wireless device and the second message is for the other of the first wireless device or the second wireless device. The operations of 1210 may be performed in accordance with examples as disclosed herein. In some examples, aspects of the operations of 1210 may be performed by a decoding component 930 as described with reference to FIG. 9.

Figure 13:
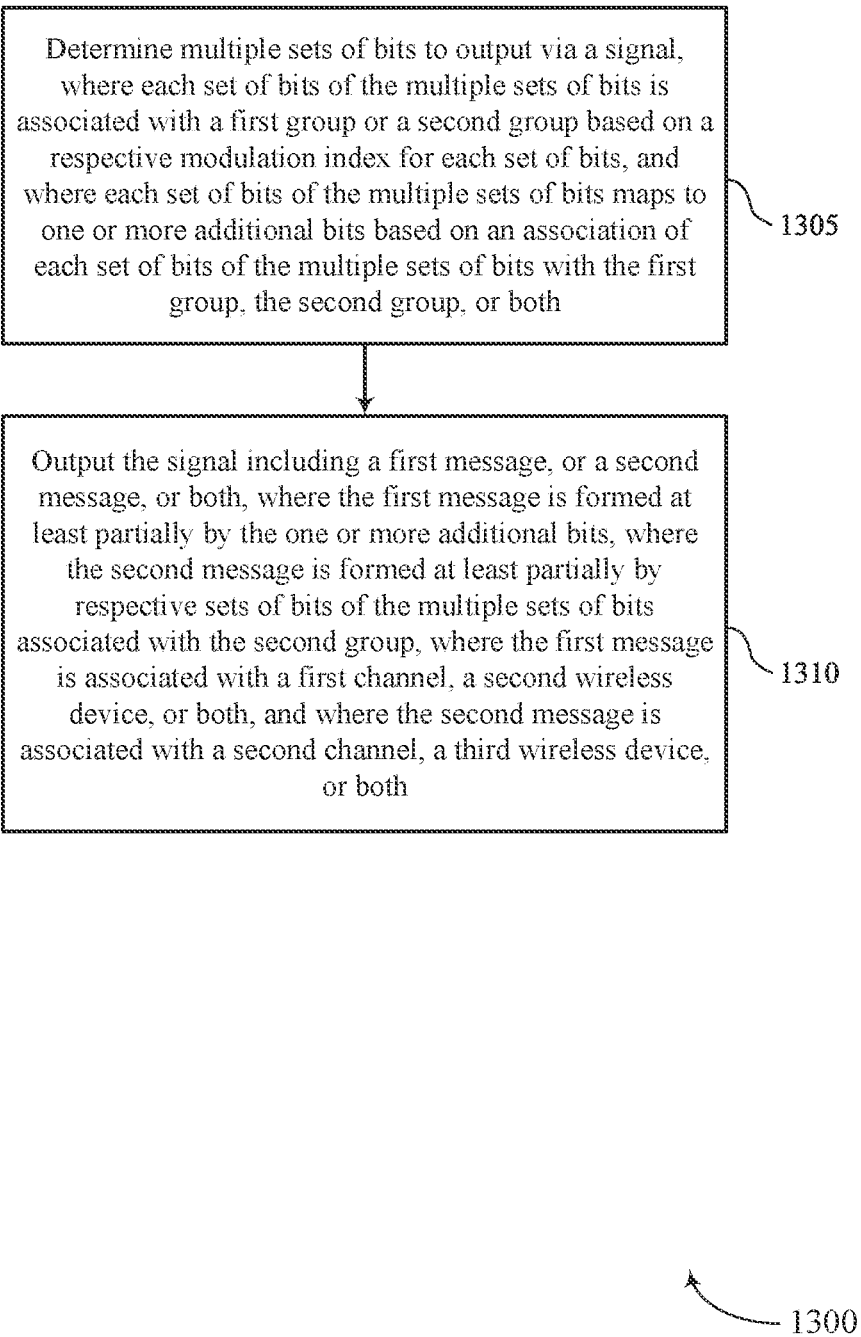

FIG. 13 illustrates a flowchart showing a method 1300 that supports multiplexing techniques using OFDM index modulation in accordance with one or more aspects of the present disclosure. The operations of the method 1300 may be implemented by a wireless device or its components as described herein. For example, the operations of the method 1300 may be performed by a wireless device as described with reference to FIGS. 1 through 10. In some examples, a wireless device may execute a set of instructions to control the functional elements of the wireless device to perform the described functions. Additionally, or alternatively, the wireless device may perform aspects of the described functions using special-purpose hardware.

At 1305, the method may include determining multiple sets of bits to output via a signal, where each set of bits of the multiple sets of bits is associated with a first group or a second group based on a respective modulation index for each set of bits, and where each set of bits of the multiple sets of bits maps to one or more additional bits based on an association of each set of bits of the multiple sets of bits with the first group, the second group, or both. The operations of 1305 may be performed in accordance with examples as disclosed herein. In some examples, aspects of the operations of 1305 may be performed by an encoding component 935 as described with reference to FIG. 9.

At 1310, the method may include outputting the signal including a first message, or a second message, or both, where the first message is formed at least partially by the one or more additional bits, where the second message is formed at least partially by respective sets of bits of the multiple sets of bits associated with the second group, where the first message is associated with a first channel, a second wireless device, or both, and where the second message is associated with a second channel, a third wireless device, or both. The operations of 1310 may be performed in accordance with examples as disclosed herein. In some examples, aspects of the operations of 1310 may be performed by a message output component 940 as described with reference to FIG. 9.

The following provides an overview of aspects of the present disclosure:

Aspect 1: A method for wireless communication at a first wireless device, comprising: receiving a signal comprising multiple sets of bits, wherein each set of bits of the multiple sets of bits is associated with either a first group or a second group based at least in part on a respective modulation index for each set of bits, and wherein each set of bits of the multiple sets of bits maps to one or more additional bits based at least in part on an association of each set of bits with the first group, the second group, or both; and decoding both a first message and a second message, wherein the first message is associated with a first channel and formed at least partially by the one or more additional bits, and wherein the second message is associated with a second channel different from the first channel and formed at least partially by respective sets of bits of the multiple sets of bits associated with the second group.

Aspect 2: The method of aspect 1, wherein the second message is formed by respective sets of bits of the multiple sets of bits associated with the first group and the respective sets of bits associated with the second group.

Aspect 3: The method of aspect 1, wherein the first message is formed by respective sets of bits of the multiple sets of bits associated with the first group and the one or more additional bits.

Aspect 4: The method of any of aspects 1 through 3, further comprising: receiving control signaling indicating a parameter, wherein the parameter indicates to form the first message at least partially by respective sets of bits of the multiple sets of bits associated with the first group when the parameter has a first value, and wherein the parameter indicates to form the second message at least partially by respective sets of bits of the multiple sets of bits associated with the first group when the parameter has a second value distinct from the first value.

Aspect 5: The method of any of aspects 1 through 4, wherein each set of bits of the multiple sets of bits is received over a distinct subcarrier, a distinct slot, a distinct spatial stream, a distinct channel state, or any combination thereof.

Aspect 6: The method of aspect 5, wherein an ordering of the one or more additional bits is based at least in part on an index for the distinct subcarrier, the distinct slot, the distinct spatial stream, the distinct channel state, or the any combination thereof over which each set of bits of the multiple sets of bits is output Aspect 7: The method of any of aspects 1 through 6, wherein the first group is associated with a first set of constellation values and the second group is associated with a second set of constellation values, the first set of constellation values being orthogonal to the second set of constellation values.

Aspect 8: The method of any of aspects 1 through 7, wherein the first channel comprises one of a data channel or a control channel, and the second channel comprises the other of the data channel or the control channel.

Aspect 9: A method for wireless communication at a first wireless device, comprising: receiving a signal comprising multiple sets of bits, wherein each set of bits of the multiple sets of bits is associated with either a first group or a second group based at least in part on a respective modulation index for each set of bits, and wherein each set of bits of the multiple sets of bits maps to one or more additional bits based at least in part on an association of each set of bits with the first group, the second group, or both; and decoding either a first message or a second message, wherein the first message is formed at least partially by the one or more additional bits, wherein the second message is formed at least partially by respective sets of bits of the multiple sets of bits associated with the second group, and wherein the first message is for one of the first wireless device or a second wireless device and the second message is for the other of the first wireless device or the second wireless device.

Aspect 10: The method of aspect 9, wherein the second message is formed by respective sets of bits of the multiple sets of bits associated with the first group and the respective sets of bits associated with the second group.

Aspect 11: The method of aspect 9, wherein the first message is formed by respective sets of bits of the multiple sets of bits associated with the first group and the one or more additional bits.

Aspect 12: The method of any of aspects 9 through 11, further comprising: receiving control signaling indicating a parameter, wherein the parameter indicates to form the first message at least partially by respective sets of bits of the multiple sets of bits associated with the first group when the parameter has a first value, and wherein the parameter indicates to form the second message at least partially by respective sets of bits of the multiple sets of bits associated with the first group when the parameter has a second value distinct from the first value.

Aspect 13: The method of any of aspects 9 through 12, wherein each set of bits of the multiple sets of bits is received over a distinct subcarrier, a distinct slot, a distinct spatial stream, a distinct channel state, or any combination thereof.

Aspect 14: The method of aspect 13, wherein an ordering of the one or more additional bits is based at least in part on an index for the distinct subcarrier, the distinct slot, the distinct spatial stream, the distinct channel state, or the any combination thereof over which each set of bits of the multiple sets of bits is output Aspect 15: The method of any of aspects 9 through 14, wherein the first group is associated with a first set of constellation values and the second group is associated with a second set of constellation values, the first set of constellation values being orthogonal to the second set of constellation values.

Aspect 16: A method for wireless communication at a first wireless device, comprising: determining multiple sets of bits to output via a signal, wherein each set of bits of the multiple sets of bits is associated with a first group or a second group based at least in part on a respective modulation index for each set of bits, and wherein each set of bits of the multiple sets of bits maps to one or more additional bits based at least in part on an association of each set of bits of the multiple sets of bits with the first group, the second group, or both; and outputting the signal including a first message, or a second message, or both, wherein the first message is formed at least partially by the one or more additional bits, wherein the second message is formed at least partially by respective sets of bits of the multiple sets of bits associated with the second group, wherein the first message is associated with a first channel, a second wireless device, or both, and wherein the second message is associated with a second channel, a third wireless device, or both.

Aspect 17: The method of aspect 16, wherein the second message is formed by respective sets of bits of the multiple sets of bits associated with the first group and the respective sets of bits associated with the second group.

Aspect 18: The method of aspect 16, wherein the first message is formed by respective sets of bits of the multiple sets of bits associated with the first group and the one or more additional bits.

Aspect 19: The method of any of aspects 16 through 18, further comprising: outputting control signaling indicating a parameter, wherein the parameter indicates to form the first message at least partially by respective sets of bits of the multiple sets of bits associated with the first group when the parameter has a first value, and wherein the parameter indicates to form the second message at least partially by respective sets of bits of the multiple sets of bits associated with the first group when the parameter has a second value distinct from the first value.

Aspect 20: The method of any of aspects 16 through 19, wherein each set of bits of the multiple sets of bits is output over a distinct subcarrier, a distinct slot, a distinct spatial stream, a distinct channel state, or any combination thereof.

Aspect 21: The method of aspect 20, wherein an ordering of the one or more additional bits is based at least in part on an index for the distinct subcarrier, the distinct slot, the distinct spatial stream, the distinct channel state, or the any combination thereof over which each set of bits of the multiple sets of bits is output Aspect 22: The method of any of aspects 16 through 21, wherein the first group is associated with a first set of constellation values and the second group is associated with a second set of constellation values, the first set of constellation values being orthogonal to the second set of constellation values.

Aspect 23: The method of any of aspects 16 through 22, wherein the first channel comprises one of a data channel or a control channel, and the second channel comprises the other of the data channel or the control channel.

Aspect 24: An apparatus for wireless communication at a first wireless device, comprising a processor; memory coupled with the processor; and instructions stored in the memory and executable by the processor to cause the apparatus to perform a method of any of aspects 1 through 8.

Aspect 25: An apparatus for wireless communication at a first wireless device, comprising at least one means for performing a method of any of aspects 1 through 8.

Aspect 26: A non-transitory computer-readable medium storing code for wireless communication at a first wireless device, the code comprising instructions executable by a processor to perform a method of any of aspects 1 through 8.

Aspect 27: An apparatus for wireless communication at a first wireless device, comprising a processor; memory coupled with the processor; and instructions stored in the memory and executable by the processor to cause the apparatus to perform a method of any of aspects 9 through 15.

Aspect 28: An apparatus for wireless communication at a first wireless device, comprising at least one means for performing a method of any of aspects 9 through 15.

Aspect 29: A non-transitory computer-readable medium storing code for wireless communication at a first wireless device, the code comprising instructions executable by a processor to perform a method of any of aspects 9 through 15.

Aspect 30: An apparatus for wireless communication at a first wireless device, comprising a processor; memory coupled with the processor; and instructions stored in the memory and executable by the processor to cause the apparatus to perform a method of any of aspects 16 through 23.

Aspect 31: An apparatus for wireless communication at a first wireless device, comprising at least one means for performing a method of any of aspects 16 through 23.

Aspect 32: A non-transitory computer-readable medium storing code for wireless communication at a first wireless device, the code comprising instructions executable by a processor to perform a method of any of aspects 16 through 23.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a first wireless device, comprising:
    a processor;
    memory coupled with the processor; and
    instructions stored in the memory and executable by the processor to cause the apparatus to:
        receive a signal comprising multiple sets of bits, wherein each set of bits of the multiple sets of bits is associated with either a first group or a second group based at least in part on a respective modulation index for each set of bits, and wherein each set of bits of the multiple sets of bits maps to one or more additional bits based at least in part on an association of each set of bits with the first group, the second group, or both; and
        decode both a first message and a second message, wherein the first message is associated with a first channel and formed at least partially by the one or more additional bits, and wherein the second message is associated with a second channel different from the first channel and formed at least partially by respective sets of bits of the multiple sets of bits associated with the second group.

2. The apparatus of claim 1, wherein the second message is formed by respective sets of bits of the multiple sets of bits associated with the first group and the respective sets of bits associated with the second group.

3. The apparatus of claim 1, wherein the first message is formed by respective sets of bits of the multiple sets of bits associated with the first group and the one or more additional bits.

4. The apparatus of claim 1, wherein the instructions are further executable by the processor to cause the apparatus to:
    receive control signaling indicating a parameter, wherein the parameter indicates to form the first message at least partially by respective sets of bits of the multiple sets of bits associated with the first group when the parameter has a first value, and wherein the parameter indicates to form the second message at least partially by respective sets of bits of the multiple sets of bits associated with the first group when the parameter has a second value distinct from the first value.

5. The apparatus of claim 1, wherein each set of bits of the multiple sets of bits is received over a distinct subcarrier, a distinct slot, a distinct spatial stream, a distinct channel state, or any combination thereof.

6. The apparatus of claim 5, wherein an ordering of the one or more additional bits is based at least in part on an index for the distinct subcarrier, the distinct slot, the distinct spatial stream, the distinct channel state, or any combination thereof over which each set of bits of the multiple sets of bits is output.

7. The apparatus of claim 1, wherein:
the first group is associated with a first set of constellation values and
the second group is associated with a second set of constellation values, the first set of constellation values being orthogonal to the second set of constellation values.

8. The apparatus of claim 1, wherein:
the first channel comprises one of a data channel or a control channel, and
the second channel comprises the other of the data channel or the control channel.

9. An apparatus for wireless communication at a first wireless device, comprising:
a processor;
memory coupled with the processor; and
instructions stored in the memory and executable by the processor to cause the apparatus to:
receive a signal comprising multiple sets of bits, wherein each set of bits of the multiple sets of bits is associated with either a first group or a second group based at least in part on a respective modulation index for each set of bits, and wherein each set of bits of the multiple sets of bits maps to one or more additional bits based at least in part on an association of each set of bits with the first group, the second group, or both; and
decode either a first message or a second message, wherein the first message is formed at least partially by the one or more additional bits, wherein the second message is formed at least partially by respective sets of bits of the multiple sets of bits associated with the second group, and wherein the first message is for one of the first wireless device or a second wireless device and the second message is for the other of the first wireless device or the second wireless device.

10. The apparatus of claim 9, wherein the second message is formed by respective sets of bits of the multiple sets of bits associated with the first group and the respective sets of bits associated with the second group.

11. The apparatus of claim 9, wherein the first message is formed by respective sets of bits of the multiple sets of bits associated with the first group and the one or more additional bits.

12. The apparatus of claim 9, wherein the instructions are further executable by the processor to cause the apparatus to:
receive control signaling indicating a parameter, wherein the parameter indicates to form the first message at least partially by respective sets of bits of the multiple sets of bits associated with the first group when the parameter has a first value, and wherein the parameter indicates to form the second message at least partially by respective sets of bits of the multiple sets of bits associated with the first group when the parameter has a second value distinct from the first value.

13. The apparatus of claim 9, wherein each set of bits of the multiple sets of bits is received over a distinct subcarrier, a distinct slot, a distinct spatial stream, a distinct channel state, or any combination thereof.

14. The apparatus of claim 13, wherein an ordering of the one or more additional bits is based at least in part on an index for the distinct subcarrier, the distinct slot, the distinct spatial stream, the distinct channel state, or any combination thereof over which each set of bits of the multiple sets of bits is output.

15. The apparatus of claim 9, wherein:
the first group is associated with a first set of constellation values and
the second group is associated with a second set of constellation values, the first set of constellation values being orthogonal to the second set of constellation values.

16. An apparatus for wireless communication at a first wireless device, comprising:
a processor;
memory coupled with the processor; and
instructions stored in the memory and executable by the processor to cause the apparatus to:
determine multiple sets of bits to output via a signal, wherein each set of bits of the multiple sets of bits is associated with a first group or a second group based at least in part on a respective modulation index for each set of bits, and wherein each set of bits of the multiple sets of bits maps to one or more additional bits based at least in part on an association of each set of bits of the multiple sets of bits with the first group, the second group, or both; and
output the signal including a first message, or a second message, or both, wherein the first message is formed at least partially by the one or more additional bits, wherein the second message is formed at least partially by respective sets of bits of the multiple sets of bits associated with the second group, wherein the first message is associated with a first channel, a second wireless device, or both, and wherein the second message is associated with a second channel, a third wireless device, or both.

17. The apparatus of claim 16, wherein the second message is formed by respective sets of bits of the multiple sets of bits associated with the first group and the respective sets of bits associated with the second group.

18. The apparatus of claim 16, wherein the first message is formed by respective sets of bits of the multiple sets of bits associated with the first group and the one or more additional bits.

19. The apparatus of claim 16, wherein the instructions are further executable by the processor to cause the apparatus to:
output control signaling indicating a parameter, wherein the parameter indicates to form the first message at least partially by respective sets of bits of the multiple sets of bits associated with the first group when the parameter has a first value, and wherein the parameter indicates to form the second message at least partially by respective sets of bits of the multiple sets of bits associated with the first group when the parameter has a second value distinct from the first value.

20. The apparatus of claim 16, wherein each set of bits of the multiple sets of bits is output over a distinct subcarrier, a distinct slot, a distinct spatial stream, a distinct channel state, or any combination thereof.

21. The apparatus of claim 20, wherein an ordering of the one or more additional bits is based at least in part on an index for the distinct subcarrier, the distinct slot, the distinct spatial stream, the distinct channel state, or any combination thereof over which each set of bits of the multiple sets of bits is output.

22. The apparatus of claim 16, wherein:
the first group is associated with a first set of constellation values and
the second group is associated with a second set of constellation values, the first set of constellation values being orthogonal to the second set of constellation values.

23. The apparatus of claim 16, wherein:
the first channel comprises one of a data channel or a control channel, and
the second channel comprises the other of the data channel or the control channel.

24. A method, comprising:
receiving a signal comprising multiple sets of bits, wherein each set of bits of the multiple sets of bits is associated with either a first group or a second group based at least in part on a respective modulation index for each set of bits, and wherein each set of bits of the multiple sets of bits maps to one or more additional bits based at least in part on an association of each set of bits with the first group, the second group, or both; and
decoding both a first message and a second message, wherein the first message is associated with a first channel and formed at least partially by the one or more additional bits, and wherein the second message is associated with a second channel different from the first channel and formed at least partially by respective sets of bits of the multiple sets of bits associated with the second group.

25. The method of claim 24, wherein the second message is formed by respective sets of bits of the multiple sets of bits associated with the first group and the respective sets of bits associated with the second group.

26. The method of claim 24, wherein the first message is formed by respective sets of bits of the multiple sets of bits associated with the first group and the one or more additional bits.

27. The method of claim 24, further comprising:
receiving control signaling indicating a parameter, wherein the parameter indicates to form the first message at least partially by respective sets of bits of the multiple sets of bits associated with the first group when the parameter has a first value, and wherein the parameter indicates to form the second message at least partially by respective sets of bits of the multiple sets of bits associated with the first group when the parameter has a second value distinct from the first value.

28. The method of claim 24, wherein each set of bits of the multiple sets of bits is received over a distinct subcarrier, a distinct slot, a distinct spatial stream, a distinct channel state, or any combination thereof.

29. The method of claim 24, wherein the first group is associated with a first set of constellation values and wherein the second group is associated with a second set of constellation values, the first set of constellation values being orthogonal to the second set of constellation values.

30. The method of claim 24, wherein the first channel comprises one of a data channel or a control channel, and wherein the second channel comprises the other of the data channel or the control channel.

\* \* \* \* \*